United States Patent
Hesford et al.

(10) Patent No.: US 12,247,896 B2
(45) Date of Patent: Mar. 11, 2025

(54) ANALYTIC SYSTEM AND METHOD FOR TESTING GEARS

(71) Applicant: THE GLEASON WORKS, Rochester, NY (US)

(72) Inventors: Andrew J. Hesford, Rochester, NY (US); William D. McGlasson, Caledonia, NY (US)

(73) Assignee: THE GLEASON WORKS, Rochester, NY (US)

( * ) Notice: Subject to any disclaimer, the term of this patent is extended or adjusted under 35 U.S.C. 154(b) by 570 days.

(21) Appl. No.: 17/753,601

(22) PCT Filed: Oct. 8, 2020

(86) PCT No.: PCT/US2020/054668
§ 371 (c)(1),
(2) Date: Mar. 9, 2022

(87) PCT Pub. No.: WO2021/072004
PCT Pub. Date: Apr. 15, 2021

(65) Prior Publication Data
US 2022/0326115 A1    Oct. 13, 2022

Related U.S. Application Data

(60) Provisional application No. 62/912,799, filed on Oct. 9, 2019.

(51) Int. Cl.
*G01M 13/00* (2019.01)
*G01M 13/021* (2019.01)
*G01M 13/028* (2019.01)

(52) U.S. Cl.
CPC ........ *G01M 13/021* (2013.01); *G01M 13/028* (2013.01)

(58) Field of Classification Search
CPC .......................... G01M 13/021; G01M 13/028
See application file for complete search history.

(56) References Cited

U.S. PATENT DOCUMENTS

| | | | |
|---|---|---|---|
| 6,120,355 A | 9/2000 | Stadtfeld et al. | |
| 7,553,115 B2 | 6/2009 | McGlasson et al. | |

(Continued)

FOREIGN PATENT DOCUMENTS

| | | | | |
|---|---|---|---|---|
| CN | 106644467 A | * | 5/2017 | .......... G01M 13/021 |
| CN | 106644467 B | | 5/2019 | |

OTHER PUBLICATIONS

International Search Report and Written Opinion for PCT/US2020/054668, ISA/EPO, Jan. 29, 2021, 12 pgs.

*Primary Examiner* — Jamel E Williams
(74) *Attorney, Agent, or Firm* — Robert L. McDowell

(57) ABSTRACT

A gear roll-testing method directed to the analysis and display of gear-set performance data, including motion transmission error, as acquired on gear-set rolling testers or gear-box test fixtures and includes the analysis and visualization of this data in the time-domain, frequency domain, and hybrids thereof. The invention further includes fundamental improvements in core signal processing, analytical and signal processing sequences that allow the data to be explored in more insightful ways, methods of visualizing and reporting the data and results, and a man-machine user-interface paradigm to provide these functions and features with greater flexibility and utility.

20 Claims, 17 Drawing Sheets

(56) References Cited

U.S. PATENT DOCUMENTS

| | | | |
|---|---|---|---|
| 10,168,248 B1 * | 1/2019 | Morey | ................ G01M 13/045 |
| 2020/0292305 A1 | 9/2020 | Wagaj et al. | |

* cited by examiner

ANALYTIC SYSTEM AND METHOD FOR TESTING GEARS

FIELD OF THE INVENTION

The present invention is directed to the processing, analysis and display of sensor output particularly with respect to the testing of gears.

BACKGROUND OF THE INVENTION

The invention is directed primarily to the processing, analysis and display of various sensor output and is particularly directed at sensor output related to gear-set motion-transmission error (MTE), noise and vibration phenomenon as can be produced by roll-testing gear sets in testing machines such as those shown and described in U.S. Pat. Nos. 6,120,355 and 7,553,115, the disclosures of which are hereby incorporated by reference. The invention may also be carried out on functional testing platforms for roll testing gears such as single flank testers or double flank testers wherein relative movement between the axes of the gears is measured when a pair of gears are rotated in mesh such as shown, for example, by FIG. 1 of US 2020/0292305 the disclosure of which is hereby incorporated by reference.

The sensors producing output to which these methods can be applied include rotary-position measuring devices such as encoders and resolvers, vibration-measuring devices such as single and multiple-axis accelerometers and acoustical sensors, and other motion or displacement-measuring devices such as optical glass scales, magnetic scales, optical, laser and ultrasound devices, capacitive or inductive displacement transducers.

The sensors can be arranged in many configurations and placements. Rotary sensors typically monitor two spindles in which the driving and driven members of a gear-set are mounted. Additional rotary encoders can measure the motion of other rotating elements in cases where the device under test includes more than just a single gear pair (e.g. gear boxes or planetary assemblies).

Linear, vibration, acoustic and other sensors can be mounted in fixed locations on or near the machine, or on linearly- or rotationally-moving elements of the machine (e.g. swinging heads and linear axes). For example, displacement-measuring devices can be applied to double-flank gear-set testers and this output also analyzed by the inventive system. Vibration sensors can respond to structure-borne vibrations, airborne vibrations, or combinations of the two.

One or more accelerometers can also be mounted on rotating spindles to measure rotary motion including acceleration, velocity, and position.

As a result of the installed members of a gear-set being rolled under given speed and load conditions established by the test machine, vibrations and other motions are induced according to the nature and quality characteristics of the gear-set being tested.

It is an object of the invention to use the aforementioned testing machine sensors to provide data and signals that can be processed and analyzed to provide insight into the operational and quality characteristics of gear-sets, particularly motion-error, noise and vibration characteristics.

It is a further object of the invention to process and analyze mathematically derived data and signals to provide additional insight into operational and quality characteristics of gear-sets. These data and signals may, for example, be obtained from computational simulations or calculated products of sensor data, such as acceleration determined analytically from positional and temporal information.

The data or signals that comprise input to the inventive system can be sampled and understood with reference to time (temporal sampling) or with reference to the rotary motion of one or more of the rotating gear members (rotary sampling). In the analysis of the aforementioned sensor signals related to gear-set motion, it is often of particular value to represent the signals with rotary sampling. When the invention employs rotary sampling, temporal information is preserved to facilitate translation between temporal and rotary sampling as necessary.

The present invention is directed to the analysis and display of gear-set performance data, including motion transmission error, as acquired on gear-set rolling testers or gear-box test fixtures and includes the analysis and visualization of this data in the time-domain, frequency domain, and hybrids thereof. The invention further includes fundamental improvements in core signal processing, analytical and signal processing sequences that allow the data to be explored in more insightful ways, methods of visualizing and reporting the data and results, and a man-machine user-interface paradigm to provide these functions and features with greater flexibility and utility.

A prominent aspect of the inventive methodologies is the ability to extract and display dynamic behaviors heretofore hidden within data records which were treated as essentially static. Other aspects include the ability to trace or attribute data and results to individual teeth on the gear-set members under test ("indexing" of the teeth) and the ability for a user to interact with the displays to dynamically change parameters of both the analysis and the visualization. In addition to conventional "contract testing" (post-processing of collected data records according to strictly pre-defined test and analysis parameters), these functions and features are also provided in a new flexible "Always On" paradigm for the gear-set rolling test machine whereby data collection, processing, analysis, anomaly detection, etc., are all performed autonomously and opportunistically whenever possible without waiting for specific instructions from human users or for predefined cycles to be initiated. In either method of testing and analysis, the human user can also adjust parameters for analysis and display in an exploratory and interactive fashion. In the present invention, it is to be understood that the terms "user" and "operator" are equivalent.

A first embodiment of the invention is directed to a method of testing gears comprising providing a pair of gears comprising a first gear and a second gear with the first gear and the second gear being operable to roll in mesh with one another. The first gear is rolled with said second gear on a gear testing machine with the gear testing machine being configured with one or more sensors operable to provide an output signal indicative of a rolling characteristic of one or more gears. At least one independent signal is produced with the independent signal being at least one of a signal based on output from one or more of the sensors or an analytically derived signal. At least one frame portion having a non-zero duration is selected from the at least one independent signal, wherein each of the selected frame portions is processed according to the following steps:
  determining a set of model basis functions based on the selected frame portion,
  projecting the selected frame portion onto the model basis functions to produce model coefficients,
  determining a reconstructed model from the model coefficients and the model basis functions, subtracting the reconstructed model from the selected frame portion to yield a residual,
wherein the method further comprises at least one of:
(a) displaying and analyzing the residual to identify quality characteristics of at least one of the first gear and the second gear, and accepting or rejecting at least one of the first gear and the second gear based on the quality characteristics, and,
(b) displaying and analyzing said model coefficients or reconstructed model to identify quality characteristics of at least one of said first gear and said second gear, and accepting or rejecting said at least one of said first gear and said second gear based on said quality characteristics.

In a preferred embodiment, the model basis functions are determined from at least one of (a) duration of the selected frame portion, (b) gear ratio of the first gear and the second gear, (c) fundamental harmonic frequencies produced by rotation of said first gear with said second gear or duration of a mesh period of said first gear in mesh with said second gear, (d) a predetermined set of harmonics for each fundamental frequency, said set including zero, and (e) a set of aperiodic basis functions defined over the duration of said selected frame portion, said set including zero.

In another preferred embodiment the reconstructed model and the residual are continually reevaluated as additional information is obtained from the sensors during machine operation.

In another preferred embodiment a plurality of the independent signals are sampled simultaneously at coincident intervals to facilitate direct correlation and comparison.

In yet another preferred embodiment at least one independent signal is collected at uniform temporal samples and is subsequently interpolated to produce a sequence of samples regularly spaced in the position of one of the first gear and the second gear.

A further embodiment the displays and analytical results are retained on an electronic storage medium for recall, with display and comparison of more than one prior record accomplished by one or more of the following:
(a) simultaneous adjacent presentation,
(b) sequential presentation with progression directed by user interaction, and
(c) sequential presentation with automatic, animated progression.

The invention additionally discloses, as being independently worthy of protection, a display and method of displaying of a residual, reconstructed model, or a combination thereof comprising:
(a) subdividing the selected frame portion into a plurality of contiguous signal segments of equal duration, with the duration equal to one or more of the following:
  1. one or more entire mesh periods,
  2. one or more entire revolutions of any gear in the set,
(b) representing the signal segments as functions of one or more of the following:
  1. time,
  2. position of one of the gears in the set,
  3. frequency, by means of a Fourier transform,
(c) presenting the signal segment functions, aligned and overlaid on the same independent axis, as one or more of the following:
  1. traces of the signal segment functions,
  2. traces of statistical variations of the signal segment functions, consisting of the arithmetic mean and/or variance, determined pointwise.

The invention further discloses, as being independently worthy of protection, a display and method of displaying of a residual, reconstructed model, or combination thereof of the two comprises:
(a) subdividing the selected frame portion into a plurality of contiguous signal segments of equal duration, with the duration equal to one or more entire mesh periods,
(b) determining, for each signal segment, a scalar metric for each signal segment, consisting of one or more of:
  1. peak-to-peak variation,
  2. root-mean-squared amplitude,
  3. a temporal or rotational shift of the signal segment necessary to best align the signal segment with a reference, determined as either: the average of at least two segments or a subset of the reconstructed model with the same duration as the signal segments,
  4. measures of similarity to a reference determined as either: the average of at least two segments or a subset of the reconstructed model with the same duration as the signal segments, consisting of one or more of the following: Pearson correlation coefficient and/or root mean squared error,
(c) assigning to each segment two indices, the first index corresponding to either:
  1. the number of entire revolutions of one of the first gear or the second gear observed in the segment signal prior to the start of the segment duration, or
  2. the number of mesh periods observed prior to the start of the segment duration, modulo the number of teeth on said one of the first gear or the second gear, the second index corresponding to either:
  3. the number of entire revolutions of the other of the first gear or the second gear observed in the segment signal prior to the start of the segment duration, or
  4. the number of mesh periods observed prior to the start of the segment duration, modulo the number of teeth on the other of the first gear or the second gear,
(d) presenting the scalar metrics, mapped to a range of grayscale or color values, onto a two-dimensional image where one coordinate of the image corresponds to the first index and the other coordinate of the image corresponds to the second index.

The invention additionally discloses, as being independently worthy of protection, a display and method wherein displaying of a residual, reconstructed model, or combination thereof comprises:
(a) subdividing the selected frame portion into a plurality of contiguous or overlapping signal segments of predetermined, equal duration, each indexed sequentially,
(b) representing, by means of a Fourier transform, the signal segments as spectral functions,
(c) determining, from the spectral functions, one or more of the following measures:
  1. magnitude,
  2. log-magnitude,
  3. phase,
  4. phase drift, as the difference between actual phase and that predicted by advancing the phase of a preceding spectral function by the temporal or rotational separation between the two segments,
(d) presenting the spectral measures, with values mapped to a range of grayscale or color values, as a two-dimensional image where one coordinate of the image corresponds to the index of the segment and the other coordinate of the image corresponds to the frequency variable of the spectral function.

The invention still further discloses, as being independently worthy of protection, a display and method of displaying comprising traces of one or more of the residual, reconstructed model, or a combination thereof on a plot where the independent axis represents time or position of one of the first gear or the second gear in the gear set and the dependent axis represents amplitude of the displayed quantity.

The invention additionally discloses, as being independently worthy of protection, a display and method of displaying of model coefficients comprising plotting one or more of:
    (a) a bar chart with one bar per coefficient, with a height proportional to the magnitude of the coefficient; and
    (b) one or more radial plots on which line segments are drawn, one per coefficient, emanating from the coordinate origin and having a length proportional to the complex magnitude of corresponding coefficients and an angle with the horizontal axis proportional to the complex phase of the corresponding coefficients.

The invention additionally discloses, as being independently worthy of protection, a method of testing gears comprising providing a pair of gears comprising a first gear and a second gear with the first gear and the second gear being operable to roll in mesh with one another. The first gear is rolled with said second gear on a gear testing machine with the gear testing machine being configured with one or more sensors operable to provide an output signal indicative of a rolling characteristic of one or more gears. At least one independent signal is produced with the independent signal being at least one of a signal based on output from one or more of the sensors or an analytically derived signal. At least one frame portion having a non-zero duration is selected from the at least one independent signal, wherein each of the selected frame portions is processed according to the following steps:
    determining a set of model basis functions based on the selected frame portion,
    projecting the selected frame portion onto the model basis functions to produce model coefficients,
    determining a reconstructed model from the model coefficients and the model basis functions,
    subtracting the reconstructed model from the selected frame portion to yield a residual,
    wherein the method further comprises at least one of:
    (a) displaying and analyzing the residual to identify quality characteristics of at least one of the first gear and the second gear, and accepting or rejecting at least one of the first gear and the second gear based on the quality characteristics, and,
    (b) displaying and analyzing said model coefficients or reconstructed model to identify quality characteristics of at least one of said first gear and said second gear, and accepting or rejecting said at least one of said first gear and said second gear based on said quality characteristics,
    wherein the method is conducted in an always-on mode wherein the preceding steps are repeated and performed continuously as long as a coordinated motion between said pair of gears is detected by said one or more sensors and new frames of data can be filled.

In a preferred embodiment the tooth ratio of the first and second gears being rolled is not known in advance in the always-on mode but the always-on mode determines the tooth ratio based on the real-time data it receives.

In a further embodiment a user can observe information comprising at least one of measurements, displays, visualizations and results at any time when the always-on mode is operating, wherein the information is available independent of whether any other testing mode is concurrently active.

In a still further embodiment the information comprises at least one of measurements, displays, visualizations and results includes at least one of:
    (a) amplitude and phasing of one or more harmonics of the frequency associated with a mesh period;
    (b) average signal shape over the duration of one mesh period;
    (c) gear runout harmonic amplitudes;
    (d) average signal shape of gear runout;
    (e) presence and location of tooth damage;
    (f) average signal shape with pinion bases removed; and
    (g) average signal shape with gear bases removed.

In yet another embodiment the method further comprising interactively manipulating the displays to better examine aspects of the displayed data.

In another embodiment of the invention, the displays can be put on hold so that a current set of displayed data can be examined without being replaced by subsequent frames.

In a further embodiment of the invention, a current set of data can be captured and stored for retrieval or examination later and/or for comparison with current data.

An additional embodiment of the invention discloses the differences between current data and stored reference or master data being examined and visualized.

In yet another embodiment of the invention, the always-on mode further comprises recognizing and localizing tooth damage on at least one of the first gear and the second gear without a requirement for separate set up of any testing parameters or settings, the always-on mode identifying part rotation or tooth indices that best represent the location of the recognized damage, the always-on mode automatically informing the user of such damage through textual messaging and/or graphical displays.

BRIEF DESCRIPTION OF THE DRAWINGS

FIG. 17 also shows the separation of a frame into segments desirable for subsequent display and analysis.

DETAILED DESCRIPTION OF THE PREFERRED EMBODIMENT

Figure 1:
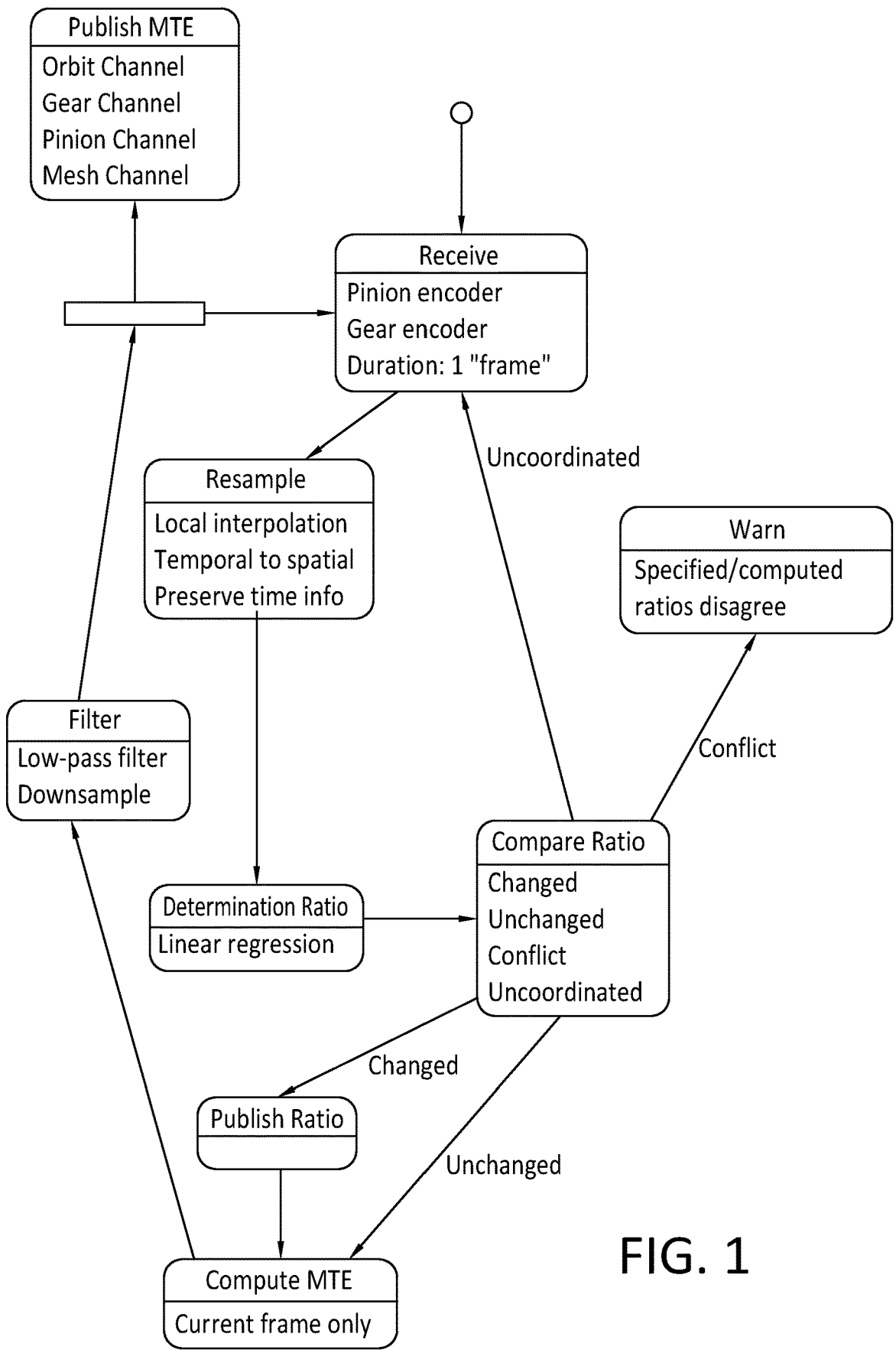
FIG. 1 shows a diagram illustrating the Always-On monitoring of encoder counts and MTE calculation.

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The use of "including", "having" and "comprising" and variations thereof herein is meant to encompass the items listed thereafter and equivalents thereof as well as additional items. The use of letters to identify elements of a method or process is simply for identification and is not meant to indicate that the elements should be performed in a particular order. In addition, terms such as "first", "second", "third", etc., are used to herein for purposes of description and are not intended to indicate or imply importance or significance. As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/".

The details of the invention will now be discussed with reference to the accompanying drawings which illustrate the invention by way of example only. In the drawings, similar features or components will be referred to by like reference numbers. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

The invention comprises analyzing any disturbance related to rotary motion of two or more gears. Currently, rotary motion transmission error (i.e. the difference between actual and ideal motion of an output gear as a function of actual motion of an input gear), linear displacement in a conventional double-flank test, and vibrational acceleration of the test structure may be considered. The invention may be carried out on a computer that is a component of the testing machine or on a computer remote from the testing machine. Information obtained from the inventive analysis may be sent directly to a gear processing machine (e.g. cutting or grinding machine) via a closed-loop system for continual process modification. Information obtained may be stored for subsequent study and analysis. It should be noted that in the present invention, either member of a gear set can be identified as the "input" gear and, therefore, the other member will be identified as the "output" gear. However, in practice, the member with fewer teeth is usually identified as the input gear.

The inventive method continually monitors machine sensors, such as those types discussed above, to determine when two or more gears in the testing apparatus are in coordinated motion. Motion may be indicated automatically by a non-zero correlation between rotary encoders on the input or output gears or by the crossing of a predetermined threshold of vibrational acceleration at frequencies predicted by the gear-set configuration.

Whenever coordinated motion is detected, data is recorded for further analysis. Rotational positions of the input and output gears are measured via rotary encoders attached to input and output spindles. Vibrational acceleration is measured via one or more accelerometers attached to the test apparatus. All measurements are temporally sampled, where sensor readings are captured at regular time intervals.

The rotary positions of the input and output gears in a set, together with any additional temporally sampled data, are interpolated (for example, by a local or global polynomial method) and resampled such that samples of all measurements occur at coincident times and the positions of the input gear advance by a uniform interval (here called rotational sampling). Irregularly spaced temporal values that correspond to the specific instants at which the temporal data are resampled are retained as an additional measurement that captures information about the acceleration of the input gear. All coincident measurements for a given position of the input gear represent a measurement "packet" of captured data for further analysis.

The rotary position of the output gear is converted into a motion transmission error measurement by subtracting from the output gear position, the ideal position predicted by the gear ratio and the coincident position of the input gear.

From rotationally sampled positions of the input and output gears, an effective gear ratio for the gear-set is determined by linear regression on the observed motion. The effective ratio is converted into an estimate of the number of teeth on the input and output gear by assuming that the set is composed of two gears and converting the floating-point ratio to a rational expression where the number of teeth on the input gear is the numerator and the number of teeth on the output gear is the denominator.

The conversion of the floating-point ratio to a rational expression may be accomplished by limiting the denominator to some maximum integer based on the application of the gears under test, or by comparing the ratio against a preselected list of possible ratios to find the closest match.

Figure 17:
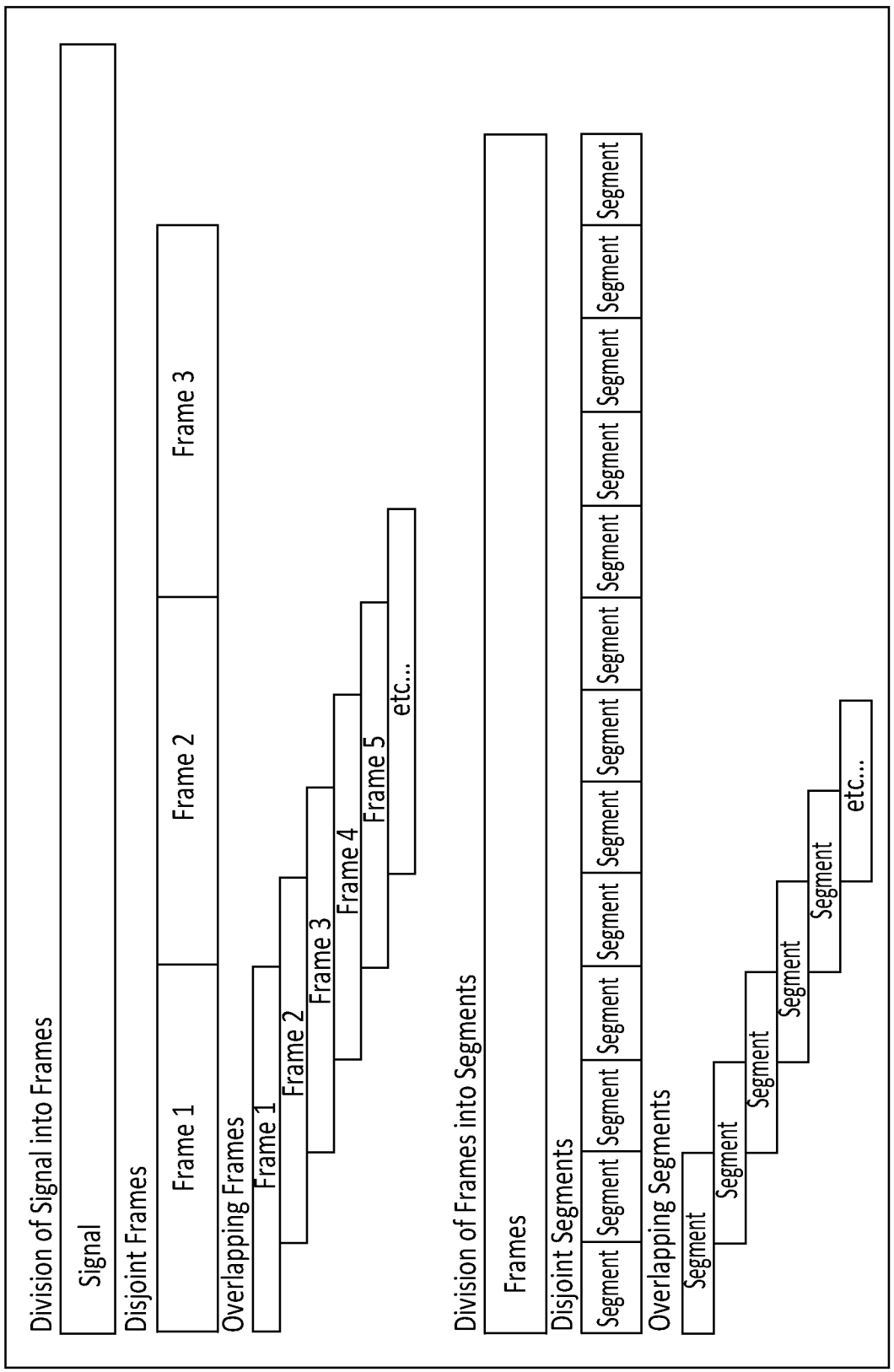
FIG. 17 depicts the separation of an input signal (for instance the output of a sensor) into frames of data of particular durations desirable for subsequent display and analysis.

Collections of samples, either from an individual signal or as "packets" of coincident samples from a plurality of signals, can be accumulated into frames (see FIG. 17, top). Each frame of data represents all or a portion of an input signal beginning at a desired starting sample and persisting for a predetermined duration. Multiple frames may overlap within a duration (see FIG. 17, "Overlapping Frames"), or they may be disjoint; disjoint frames need not be contiguous within a duration.

In conventional gear-set testing, one test record or defined series of records are collected, whereupon distinct analyses or DFT transformations are made upon each record. As a consequence, these analyses deliver results and conclusions only about the average conditions within a record, but do not attempt to assess variability of characteristics within the record.

For instance, in setting up conventional testing, a record with a duration of 4 gear revolutions might be selected from which to derive and display time-domain and frequency domain results. A resulting measure of MTE at the once-per-mesh frequency might indicate a magnitude of 55 microradians, but this is essentially an average of that component measured over the 4 gear revolutions record length. A finer study of the data might show that the magnitude was 65 microradians for the first two gear revolutions and 45 microradians for the last two gear revolutions. Exposing this variability in magnitude may provide important clues as to the quality characteristics of the gear-set or test conditions that were not revealed by the conventional analysis method.

In the inventive testing method, on the other hand, multiple shorter frames may be defined within a particular test record. Analysis of the signal or signals within each frame provide information about the more localized dynamic behavior of gear sets. Because frames are permitted to overlap and the durations are arbitrary, it is possible to define a frame with a duration equivalent to the entire test record to replicate current conventional testing results in addition to the dynamic analysis facilitated by the inventive approach.

Figure 18:
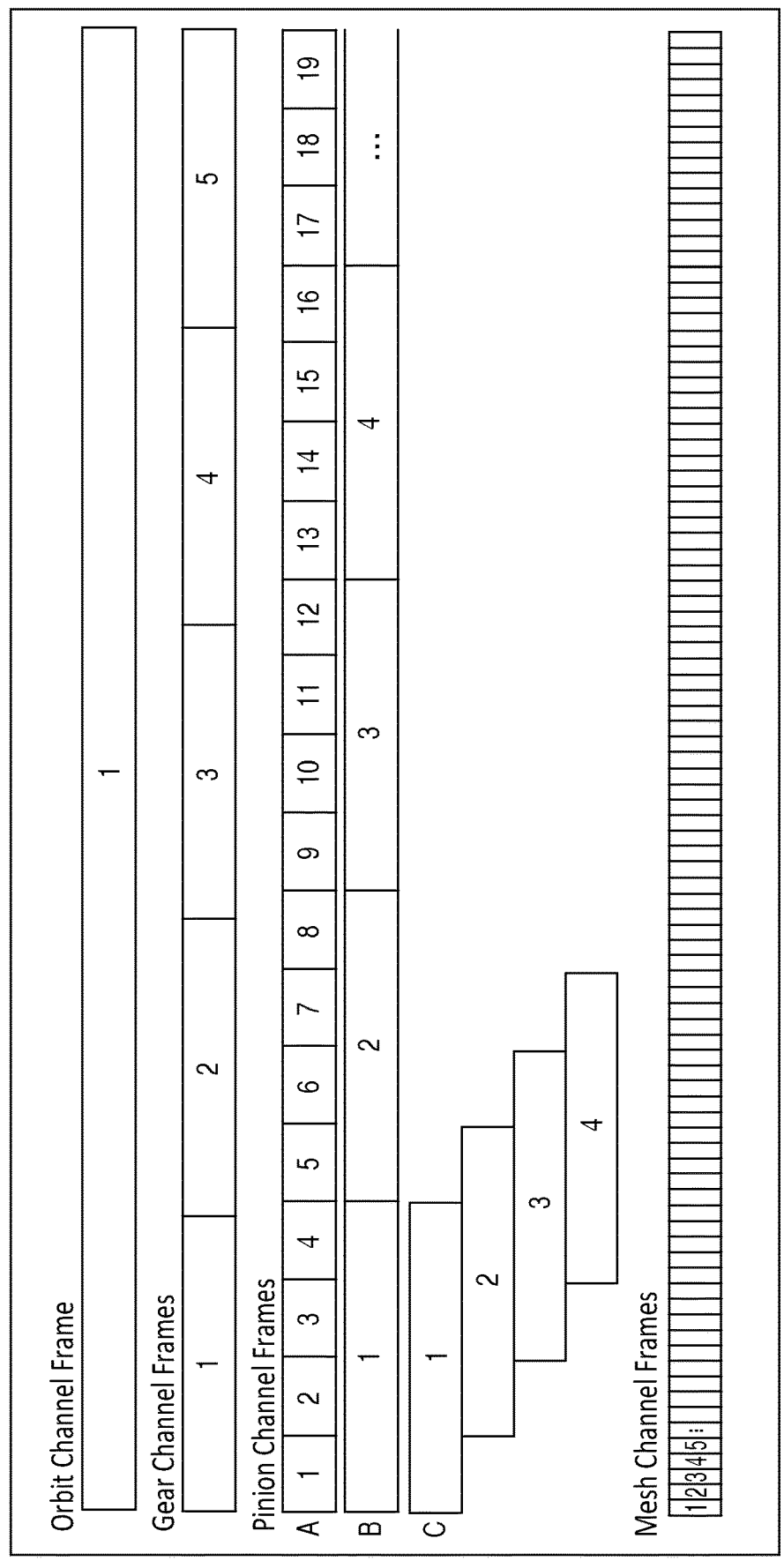
FIG. 18 illustrates examples of multiple channels which can be employed in the present invention.

The lengths of frames may be chosen to correspond with a variety of interesting phenomena related to motion of a gear set. Moreover, collections of frames can be accumulated into "channels" (see FIG. 18) that characterize a sequence of related frames. FIG. 18 illustrates examples of multiple channels which can be employed in the present invention with respect to an example 5:19 ratio gear pair. An Orbit channel is shown composed of a frame one full orbit (5 gear revolutions) in length. A Gear channel is shown composed of a series of frames one full gear revolution in length. Three types of Pinion channels are shown: type A is composed of a series of contiguous frames of one full Pinion revolution in length; type B is composed of a series of contiguous frames of 4 pinion revolutions in length; and type C is composed of a series of overlapping frames of 4 pinion revolutions in length. Finally, a Mesh channel is shown composed of a series of contiguous frames of one mesh period in length.

For example, a channel may be defined as a collection of one or more frames, each having a duration equal to an integer number of any of the following:

one mesh period, which is the duration over which a single pair of teeth between any two gears in the set is expected to maintain a dominant influence on the relative motion of the members; an ideal mesh period duration can be obtained mathematically by dividing a full rotation period of any gear by its number of teeth, one revolution of any gear in the set, or an "orbit", commonly called a "hunting tooth", which is the least common multiple of the number of mesh periods that comprise a single revolution of each of any two interconnected gears in the set.

As shown by example in FIG. 18, channel or frame durations may depend on the number of mesh periods (teeth) that comprise a single revolution of each member. If the user has not specified a gear ratio, the automatically determined estimate is used to identify durations assuming a two-gear set. If the user specifies a gear ratio, potentially involving more than two gears in a set, channel durations are derived from the user-specified values.

Within each channel and frame, a core model of one or more collected measurements may be derived as the sum of one or more truncated Fourier series, each an orthogonal basis and here called a "component basis". The fundamental frequency of each series is the rotational frequency of one gear in the set expressed in relation to one revolution of the input gear. Additionally, one component basis has a fundamental frequency that corresponds to that of a single mesh period, again expressed in relation to one revolution of the input gear. More than one fundamental mesh period may exist in gear sets containing more than two gears, in which case one component basis may be assigned to each mesh period.

The fundamental frequencies for each component basis are determined from gear ratios and tooth counts specified by the user, if such specification was made. Otherwise, the frequencies are determined from the number of teeth automatically estimated from the determined gear ratio assuming a two-gear set.

The truncation of each component basis may be determined automatically, such as by an algorithm, or manually by user selection.

Within each frame, any component basis with a fundamental period longer than the duration of the frame is either completely excluded from the model, or altered such that only those components with periods shorter than the frame duration are represented in the model. The model for any frame may be supplemented by estimates of any longer-term, excluded components that are determined in alternate channels with frames of sufficiently long duration.

The Fourier model may be augmented with one or more additional bases that represent periodic phenomena external to the gear-set under test, here called collectively the "external bases", or with orthogonal basis functions, here called an "aperiodic basis", that represent aperiodic phenomena over the duration of each frame. The preferred inventive implementation uses truncated series of Legendre polynomials as an aperiodic basis to model behavior on scales longer than the maximum harmonic period.

Coefficients of all Fourier bases of the model may be determined simultaneously by fast Fourier methods such as the common Fast Fourier Transform (FFT). This is the conventional choice for finding the frequency-domain harmonic content of such signals, and the disclosed system can provide this method of solution. But applying these well-known and efficient fast Fourier methods can lead to errors in identifying harmonic content whenever non-periodic signal content is present. Therefore, the inventive system also includes alternative methods that can reduce or eliminate such errors.

One such alternative provided by the system determines the coefficients of all bases of the model, including aperiodic or external basis, simultaneously by least-squares optimization, with arbitrary weights assigned to different bases to emphasize one over the other and to resolve ambiguities that result from potential non-orthogonality of different bases. This method is less sensitive to "spectral leakage" errors associated with non-periodic content (e.g. when a frame to be analyzed contains a non-integer number of revolutions of one or more gears) that plagues conventional fast Fourier analysis.

Another alternative provided by the system determines the coefficients of the model iteratively by projecting, in a predetermined but arbitrary order, the data less any previously determined model onto each basis in turn. The iterative process repeats until the coefficients for any basis do not deviate from those determined in the previous iteration by more than a predetermined amount. This method can be accomplished by employing, for instance, the well-known FFT with spectral leakage iteratively removed from the model. Note that in the general case of a fully unknown signal, errors associated with FFT leakage are inherent and cannot be eliminated by any means. But where certain frequencies are known with certainty to exist in advance (e.g. given gear and pinion harmonics), the iterative projection technique can be "seeded" with these known periods and the iterative projection method employed with great benefit.

After a core model is determined within each frame for one or more measurements, a residual for that frame and measurement is calculated by subtracting the model from the measurement. The residual represents the portion of the measurement not explainable by the model and provides a foundation for further analysis of irregular gear-set behavior.

As data is recorded for coordinated motion, predetermined speculative analysis are performed on each channel, including, but not limited to:

Instantaneous values of Fourier and other basis coefficients within each frame in the channel;
Instantaneous peak, root-mean-square and average amplitudes over the duration of each channel;
Instantaneous "spread" of each Fourier basis coefficient, as the proportion of power in the corresponding frequency to total power in a spectral band centered on that frequency with a width sufficiently narrow that it does not encroach on similar bands surrounding neighboring components within in the same Fourier basis.

In addition to instantaneous values, statistical variations in the computed values in the frames of each channel are calculated and reported.

An embodiment of the invention comprises a measuring paradigm that includes an "Always-On" aspect and a "Contractual" aspect. The Contractual functionality is the conventional approach known for many years and includes testing that is configured and defined ahead of time by users according to various settings and parameters. It defines the test conditions, analyses and reports to be produced throughout the test. This is the way that gear test machines with advanced measurement capability are believed to operate today. In other words, almost no information is presented to the user except that which was specifically requested and configured in advance by setting up the recipe (or "summary") for the testing. If the position, motions, speed, load or timing exhibited by the machine do not match the expectations (or "contract") of the inspection system, then typically a warning or alarm results and the test is aborted.

By contrast, the Always-On mode of operation allows the measurement system to collect, analyze and publish data at all times. Thus, whenever power is applied to the measurement system and the software is operational, it collects and analyzes any data available and attempts to derive and display as much useful information as it can about its present condition and that of the gear-set being tested, if any. In the present invention, the Always-On functionality and the Contractual functionality are not mutually exclusive and can be exercised simultaneously. Data recorded during continual monitoring may be accessed for subsequent contractual testing without requiring additional motion of the gear-set.

The Always-On system begins with continuously monitoring the sensors available. It then processes and displays the resulting measurements and data in real time and in useful formats for the consumption of the user. The Always-On system attempts to be as independent and robust as possible so as to intelligently derive a collection of parameters, settings and values that describe its current condition and to report discrepancies rather than be disabled or confused by them.

For instance, if a gear-set (e.g. bevel pinion and ring gear) with an 11:38 tooth ratio is installed and rolling in the machine and yet the software system was set up to expect a 9:38, a conventional measurement system would not process any information or detect any discrepancy until a contract test had begun. At that time, it would likely report a fault and/or produce incorrect measurement results because of the unexpected ratio.

The fault-tolerant, Always-On system, on the other hand, would at the earliest moment possible recognize that both spindles were turning, that moreover they were following closely a given ratio of motion (and thus it would infer that a gear-set was being rolled), that the ratio of motion was, for instance, 3.455 and that 11:38 was the most likely actual tooth ratio to correspond. It would immediately begin to analyze and publish typical single-flank testing (SFT) and structure-borne noise (SBN) data associated with such a gear-set, including mesh harmonic amplitudes, run-out components and more. By immediately publishing the detected ratio, the machine controller could compare the measurement system data with its own expected parameters at a much earlier time and initiate messages to the user as expedient.

During Always-On operation, encoder output is continually monitored following the process depicted using the example of an MTE signal in FIG. 1. For each defined channel, the method observes encoder streams for a frame of that channel. As will be described below, the encoder positions are originally sampled regularly in time, but measurements are often desired at regular rotational positions. Therefore, after each frame is received, it may be resampled by local interpolation to preserve regular spacing in angular position of one of the gear-set members. The resulting encoder data is then used to determine, by linear regression, an estimate of the current gear ratio. If no coordinated motion is detected, the data is abandoned and the method awaits the next frame of encoder information. Otherwise, the MTE is calculated from the frame. If the gear ratio differs from expectation or appears to have changed from the last frame, the newly detected ratio is provided to subsequent analysis modules or other interested observers. The MTE is low-pass filtered and down-sampled to mitigate quantization noise in the encoder hardware, and the resulting signal is made available for subsequent processing.

Additional signals may be collected simultaneously with the MTE, as functions of the outputs of other sensors attached to the machine. For each channel, these signals will be grouped into durations of one frame coincident with the frames over which MTE is represented.

Each channel is augmented with new frames as they become available; frames collected prior to the predetermined channel duration are discarded.

In the preferred implementation of Always-On analysis, a gear-set consisting only of a single pinion meshed with a single gear will consist of a mesh channel whose frame duration is some number of mesh periods, a pinion channel whose frame duration is some number of pinion revolutions, a gear channel whose frame duration is some number of gear revolutions, and an orbit channel whose frame duration corresponds to one or more full orbits of the gear and pinion.

Figure 2:
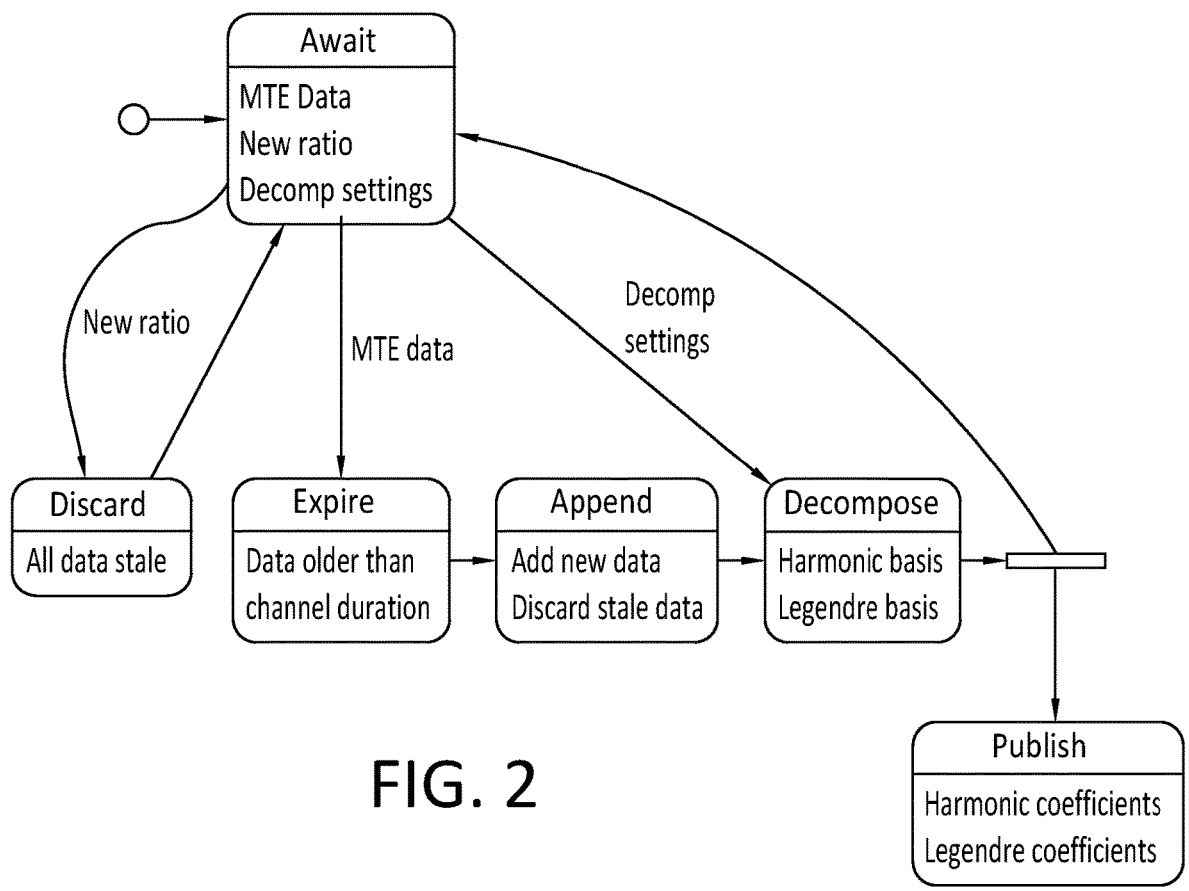
FIG. 2 illustrates a preliminary analysis of streaming MTE data in a particular channel.

Each channel awaits new frames, a newly discovered gear ratio or a change in configured parameters for harmonic decomposition (described below) to perform automatic analysis as depicted for the example of MTE analysis in FIG. 2. When a notification of a change in the gear ratio is received, all currently retained MTE data is discarded since appending MTE data from two different ratios does not produce useful analysis. When new MTE data is received by the channel, it is appended to the channel record and potentially "stale" data (that which falls outside the configured duration for the channel) is discarded. The currently retained MTE frame is passed to a decomposition module that produces a model of predictable components in the actual MTE, and the model is published to further analysis or visualization components. The decomposition is also recalculated whenever decomposition settings for the channel are altered by automatic processes or user request. Although not depicted in the figure, additional automatic analysis could happen within each channel.

Figure 3:
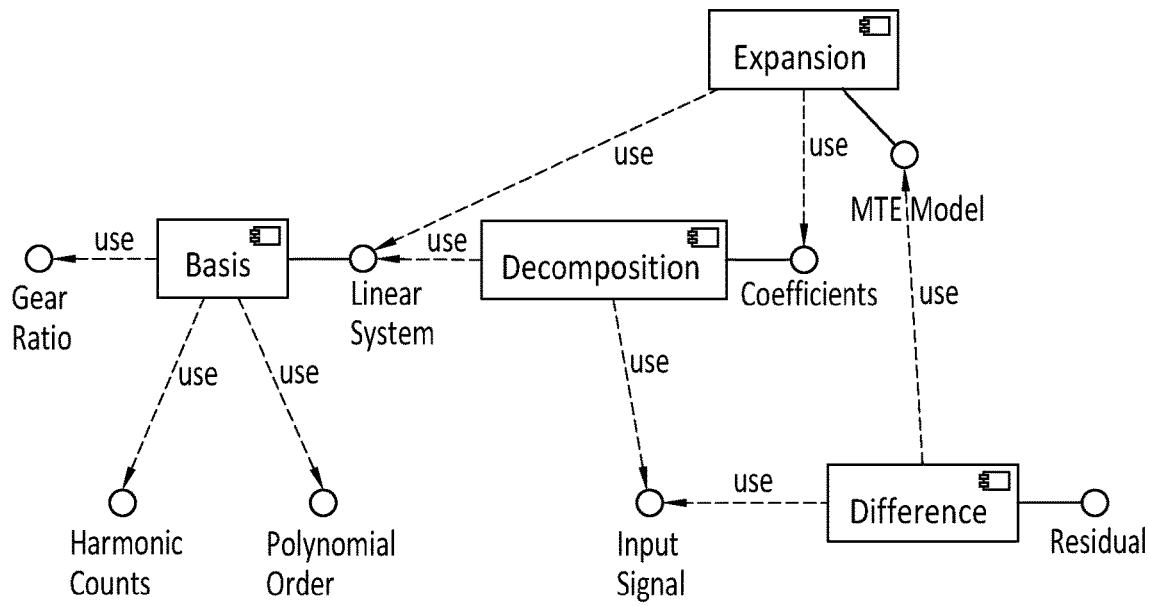
FIG. 3 shows a component diagram depicting stages of the harmonic decomposition process.

The basis decomposition process is illustrated in FIG. 3. A gear ratio, the set of desired harmonic components ("harmonic counts") and an optional maximum polynomial order serve as inputs to a basis module, which determines a set of basis functions (a "linear system") for the signal. The decomposition module embodies an algorithm to produce, from the linear system and an input signal as inputs, a series of basis coefficients that represent the model. The linear system and corresponding model coefficients are provided as inputs into the expansion module, which produces an expanded model of the signal ("MTE Model"). The signal model is subtracted from the input signal by the difference module to produce a residual error.

The Always-On system checks at all times for other issues such as tooth damage such as nicks and burrs, tooth spacing errors, evidence of parts slipping or creeping in arbors, intermittent floating or rattling of lightly-loaded parts or other aberrant conditions. As it creates data and conclusions about such phenomena, it publishes these results to the user interface (UI) and other system components so appropriate actions can take place. By doing this all without an explicit specific contract to check for these conditions, detection is simplified, phenomena identified earlier, users can learn more about current conditions regardless of the status of a particular contractual test, and the system behaves in a more intelligent and autonomous way.

The Always-On user interface also allows for interaction and exploration. The user can navigate screens and displays, access more detailed views of measurement aspects, and change real-time parameters and settings of the data collection and analysis in order to understand and quantify aspects of gear-set behavior. To support such extended exploration, the machine-side of the tester, which controls parameters of the test including motions, speed and load, can be put into a "hold" state to facilitate closer examination of data utilizing Always-On analyses and UI capabilities. The hold state may involve suspending or ignoring the flow of new signals and data, either while motion of the gear-set continues in its prior state or stops entirely. A hold state may also employ a steady stream of new information obtained from rolling the gear-set at constant velocity, allowing the operator to look at real-time deviations from ideal gear-set behavior for an indefinite time.

The Always-On mode also makes provision for capturing current data for a predefined duration in a database, file system or volatile computer memory. The user may opt to retain specific intervals of capture and analysis results indefinitely, or apply contractual testing retroactively to the retained measurement data.

In production mode, contractual testing defined by settings is automatically initiated by the machine controller according to its predefined cycle sequences and timing, the data collected, and the results displayed without interference to any Always-On functionality which may be simultaneously active.

In processing the data, for instance motion transmission error data derived from rotational SFT measurements, several approaches may be incorporated. Gear-set analysis typically uses "rotary" sampling, where gear and pinion encoder signals are sampled uniformly in the rotational change of the pinion encoder (i.e. the difference between any two successive samples of the pinion encoders is constant). The resulting analysis inherently relates periodic phenomena to specific points in the rotation of the gear or pinion under test. Because sampling hardware commonly uses regular temporal intervals when sampling, and gears may rotate at non-constant velocities, encoder signals must be interpolated to convert regular temporal sampling to regular rotary sampling. The bandwidth of sampling hardware is typically much higher than that needed for analysis of gear sets. Sampling is preferably performed at the highest supported frequency to realize two principal benefits. First, the interpolation responsible for converting temporal sampling to rotary sampling is subject to lower error. Second, applying a low-pass filter in the data acquisition software and down-sampling the oversampled signal reduces quantization noise present in digitized signals.

When converting temporally sampled encoder signals to rotary sampling, timing information inherent to the temporal sampling is retained in the form of timestamps associated with each sample. These timestamps provide information about the velocity and acceleration of gear sets that is useful for alternative analysis or for conversion back to temporally sampled signals. Sampling at the highest possible rate ensures that these timestamps, and the resulting imputed velocity and acceleration, have minimal error.

In contrast to current measurement systems, the invention maintains a tooth indexing system that allows specific temporal features of motion transmission error to be correlated with periods of contact between specific gear and pinion teeth. By default, any record of a gear-set test, which starts when a gear and pinion are chucked in a roll tester and begin rolling in coordinated motion, assigns a gear-tooth index of one and a pinion-tooth index of one to the first teeth that make contact on the respective gear-set members. The gear and pinion indices are both incremented as the motion continues through each subsequent theoretical period of tooth contact, with the index for each member wrapping back to one whenever the incremented index would exceed the number of teeth on that member. The theoretical period of tooth contact represents a simplified view of tooth contact where a single pair of contacting teeth (the teeth of current index) are designated as active at any given time. The theoretical period of tooth contact can be understood as the period of one rotation of a gear member divided by its number of teeth. In actuality, more than one pair of enmeshed teeth may be in meaningful contact for a given gear pair at a given time, due to both gear design and tooth deformation under load. The tooth indexing system of the inventive system preferably makes an assumption of this theoretical period, but it is envisioned that it can also support the designation of multiple (overlapping) tooth pairs if sufficient information regarding this behavior is supplied.

The control interface of the roll tester may be augmented with awareness of tooth numbering in two ways. First, the interface may present an "indicator" option that will allow the operator to select desired indices for gear and pinion teeth and cause the roll tester to independently place the desired teeth in a predetermined orientation. Second, the interface may present a "teaching" option to enable a desired index sequence to be recognized. The operator may manually position the gear and pinion to align the designated starting teeth (each with an index of one) in a predetermined orientation and, through the teaching interface, direct the software to record the member orientations as a reference. Until the parts are later de-chucked, all data records provided for analysis or visualization after the teaching operation will include additional tags to indicate the labeled reference positions. These reference positions tags may be used as references that allow the operator to discover which specific teeth were in contact at any point throughout the test.

Many of the analyses performed may be coupled with specialized visualizations that allow exploration of roll-tester data in novel ways. However, the coupling of analysis and visualizations is one of convenience, not necessity. Each of the analytical steps and the visualizations may be considered separately in the realm of gear-set testing. The underlying analyses could be applied to Always-On or Contractual data without presenting visualizations. The results of these analyses could be compared to thresholds or otherwise reduced by some means (e.g. statistically) to facilitate simpler reporting or render automatic pass-fail decisions about the gear-set under test.

At least five types of visualizations are contemplated:
model decomposition,
DFT (Discrete Fourier Transform) magnitude,
overlay,
spectrogram and
mesh grid.

The five types of visualization are preferably all linked by a core model and residual which provides the foundation for all visualizations.

Figure 4:
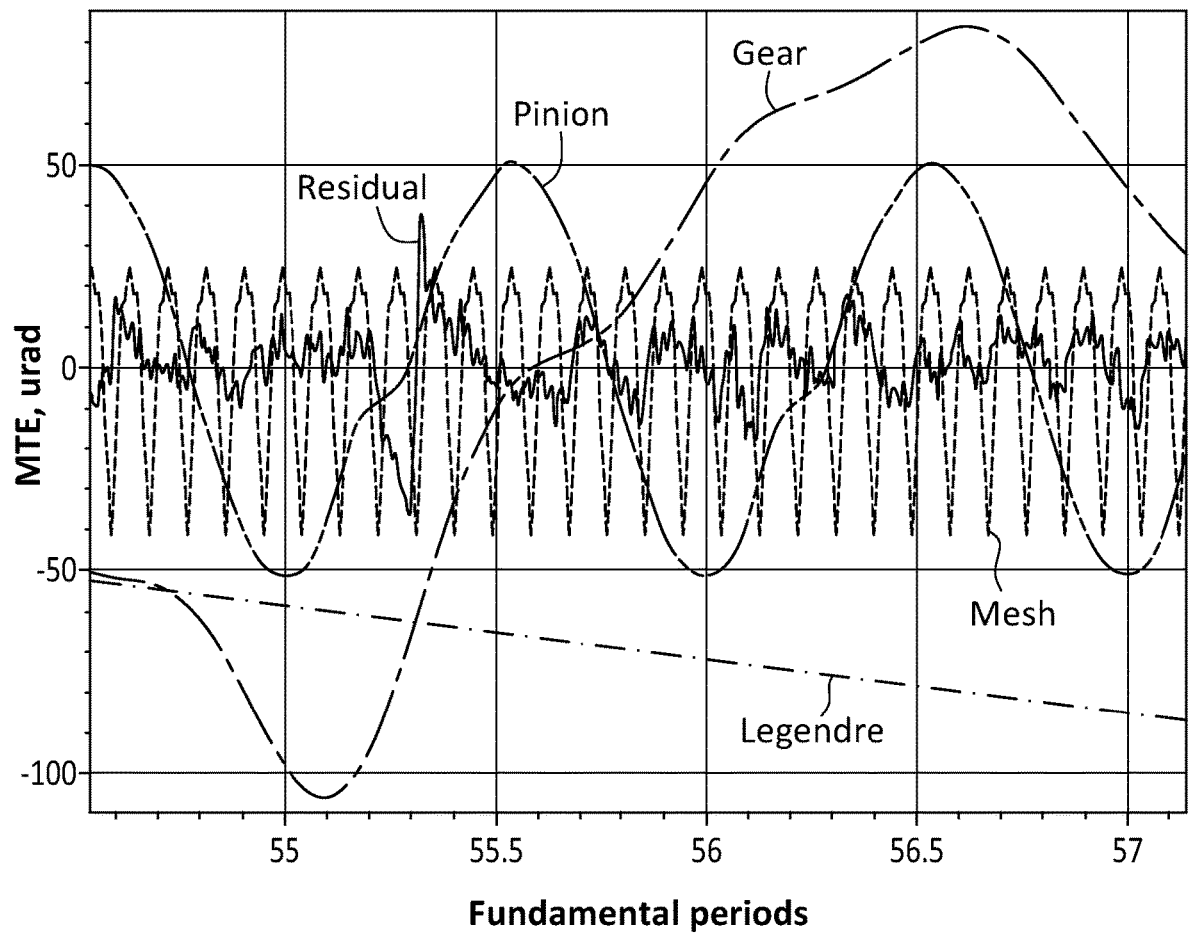
FIG. 4 depicts the display of MTE data decomposed into gear, pinion and mesh component bases, a Legendre polynomial basis and the residual error used for subsequent analysis.
Figure 5:
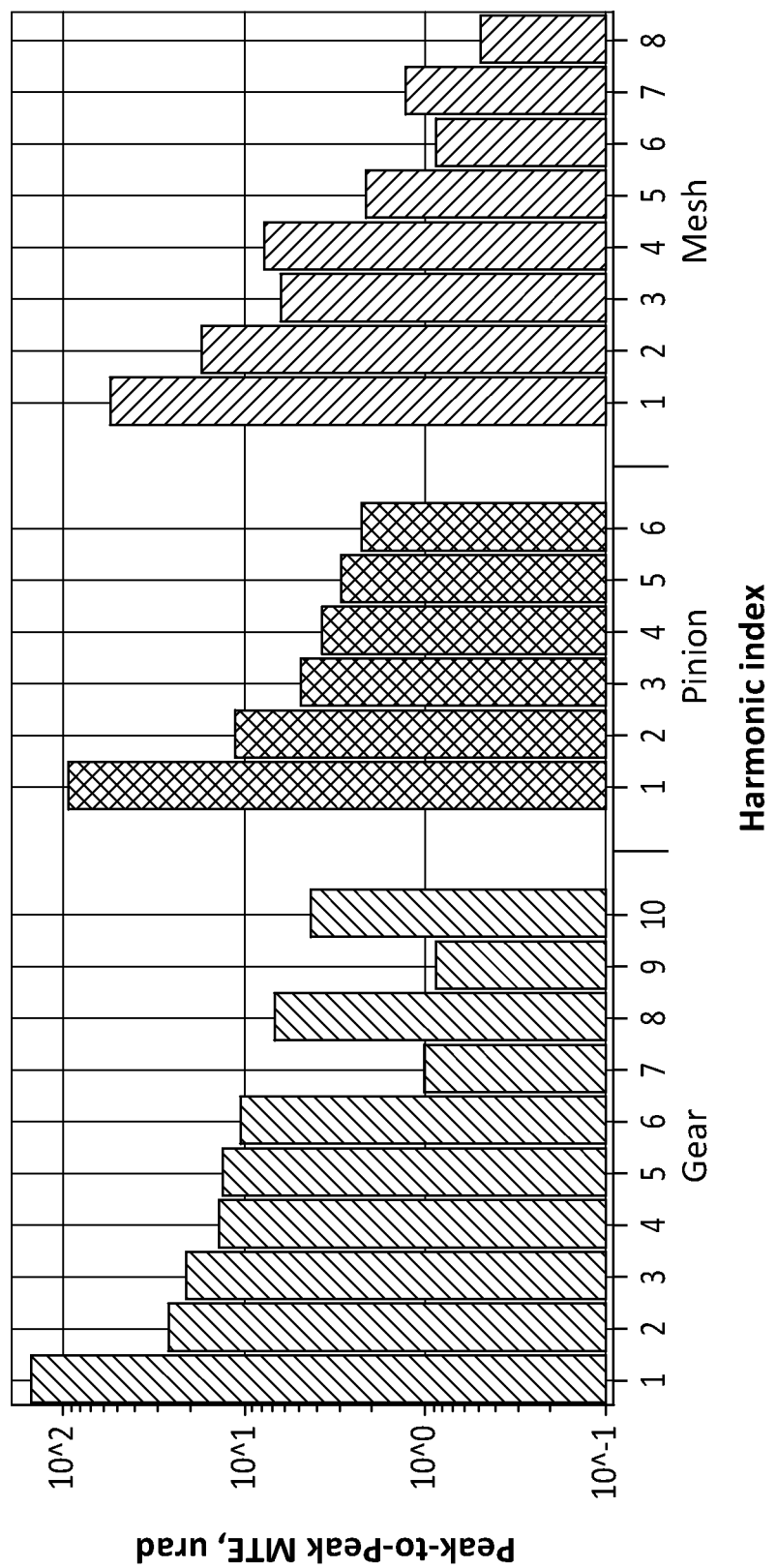
FIG. 5 illustrates the display of magnitudes of decomposed gear, pinion and mesh component bases for example MTE data.

In Model Decomposition visualization as shown in FIGS. 4 and 5, for each selected measurement, the decomposition view shows individually, on common axes where the input gear position represents the independent variable and the measurement represents the dependent variable, the expansion of each component, external and aperiodic basis as the linear combination of the functions in that basis weighted by the determined model coefficients. The residual for each measurement is shown alongside each basis expansion.

User-interface controls allow the operator to toggle the visibility of each basis expansion or residual.

A control allows the operator to select a preferred display scale, as the fundamental period of any component or external basis represented in the model or models, which cause the input gear position to be scaled such that one unit on the display axes represents the selected fundamental period.

Figure 8:
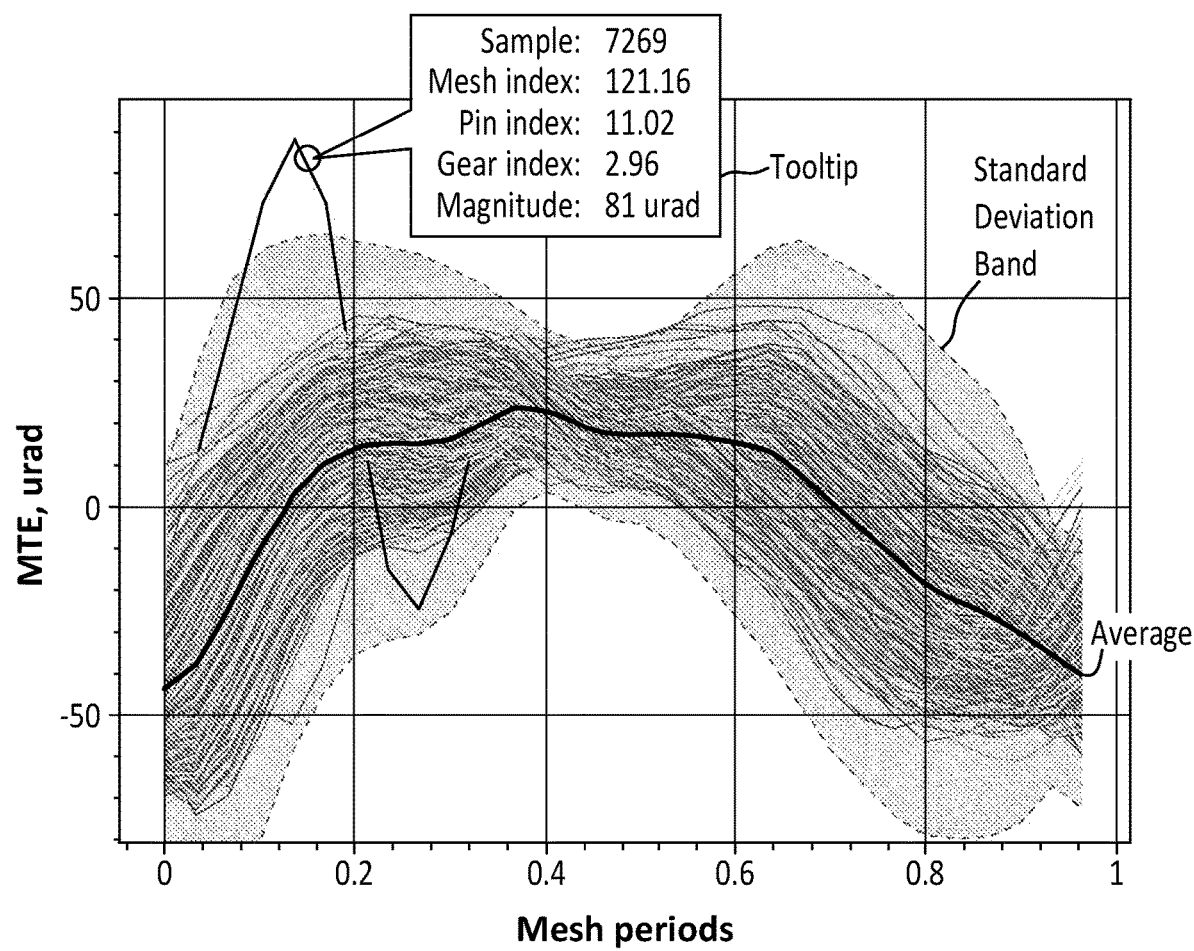
FIG. 8 illustrates the display of the same overlays depicted in FIG. 7, but with modeled gear and pinion harmonic components subtracted from the signal to highlight variations in MTE attributable directly to individual tooth contacts between members. The average value of the overlaid frames is depicted in black and a variance band shown as a shaded gray region bounded by dashed lines, both superimposed on the individual frame plots.
Figure 9:
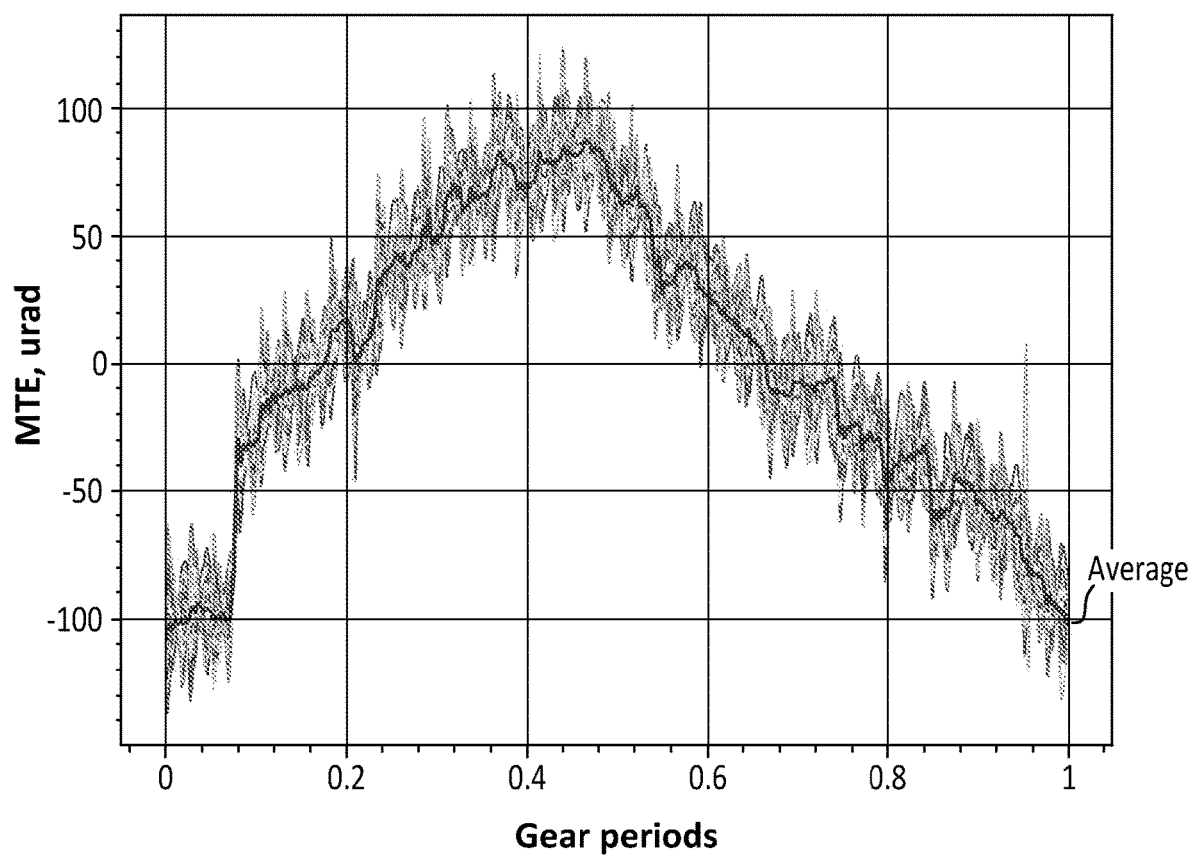
FIG. 9 depicts the display of a multitude of MTE data frames of gear-period scale, superimposed on a common axis and with modeled pinion-scale and mesh-scale components subtracted from each frame to emphasize only the portion of MTE directly attributable to gear variations. The average MTE is shown superimposed in black.
Figure 10:
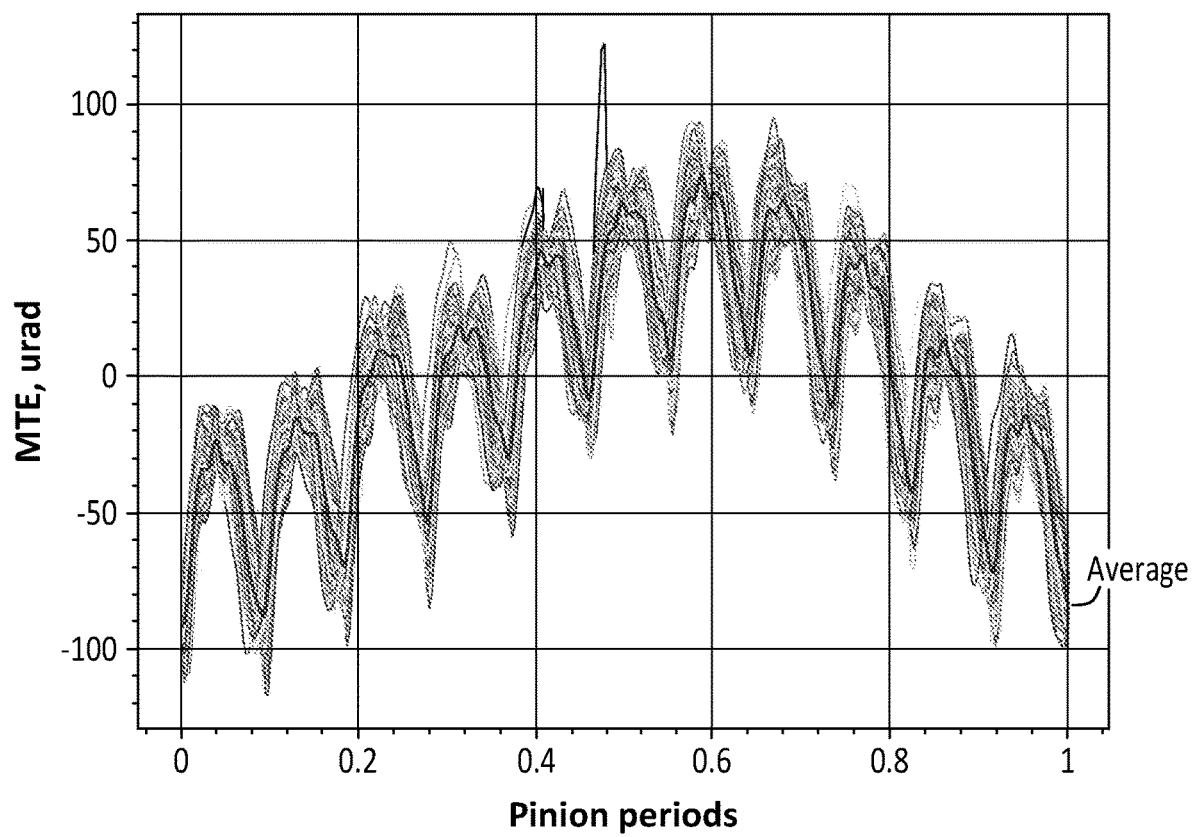
FIG. 10 illustrates the display of many MTE data frames of pinion-period scale, superimposed on a common axis and with modeled gear-scale components subtracted from each frame to emphasize only the portion of MTE attributable to pinion and individual tooth variations. The average MTE over the displayed frames is depicted superimposed in black.

A user-interface element ("tooltip") allows the operator to position a cursor on the plot to discover the specific amplitude of each displayed component and the position of the input gear in the vicinity of the cursor. An example of a tooltip is shown in FIG. 8 where it should be understood that the data shown is relevant only for that particular line and position on that particular graphical display.

On separate axes, a bar chart or line plot like that depicted in FIG. 5 shows the magnitudes of some or all of the model coefficients, grouped by measurement and basis, and labeled to allow discovery of specific coefficient amplitudes.

The tooltip allows the operator to position a cursor on the magnitude plot to discover the specific numerical value of a particular coefficient, along with sufficient information to identify the specific component queried.

Decomposition analysis represents periodic components of motion transmission error as multiples of per-gear, per-pinion or per-mesh harmonics, along with optional aperiodic polynomial trends. Harmonic analysis is common in current gear-set testing systems. However, the decomposition performed by the inventive method improves on conventional analysis by employing aforementioned decomposition methods that diminish the effects of spectral leakage and account for aperiodic behavior not represented in current systems.

For each gear in the gear-set, low-order harmonic components determined by the decomposition are displayed to the user as idealized or modeled gear response, and some number of these components (either chosen explicitly by the user or automatically selected by the program) are subtracted from the motion transmission error to yield a residual error that represents noise sources uncorrelated to rotation of the gear-set as well as higher frequency per-mesh harmonic content. The residual error may be the basis of further analyses and visualizations.

Figure 6:
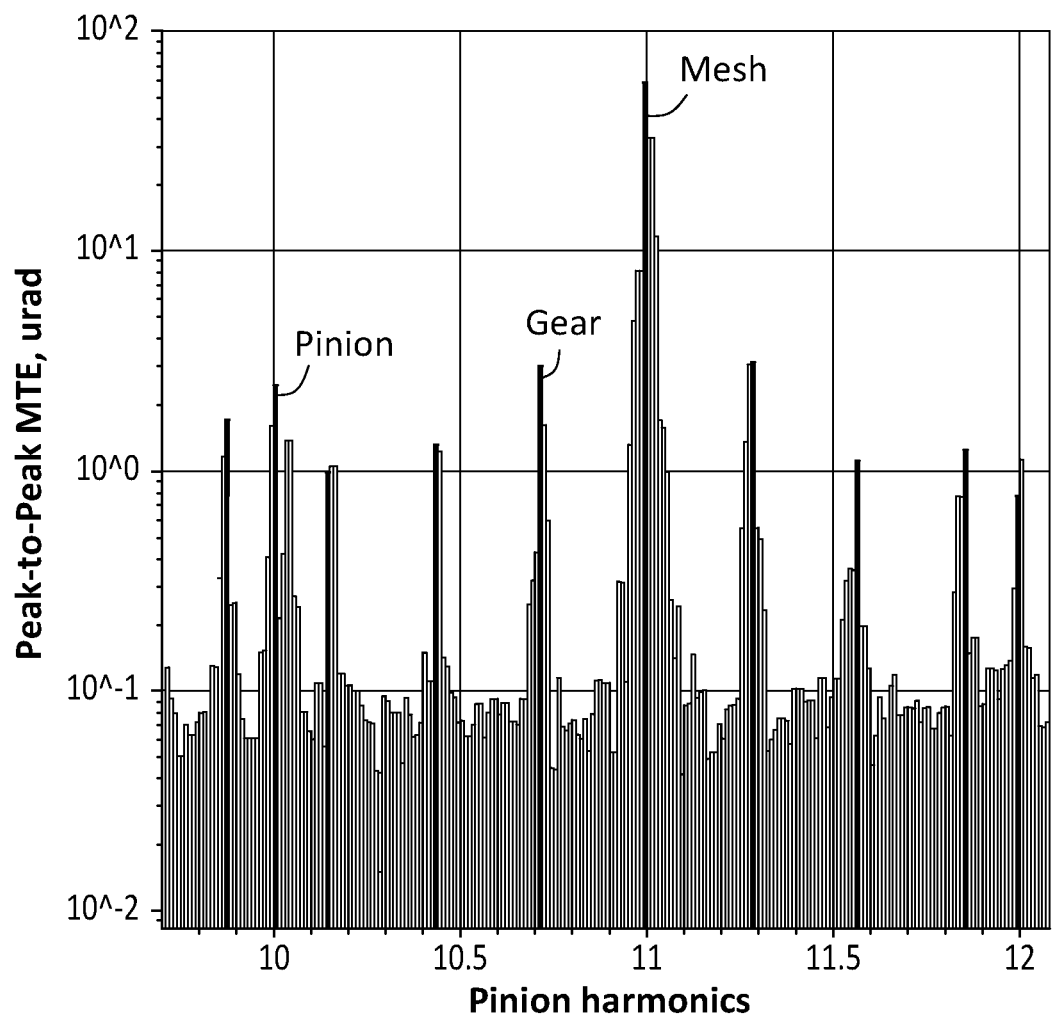
FIG. 6 shows a discrete Fourier transform view of MTE data, with harmonics of gear, pinion and mesh frequencies highlighted and frequencies uncorrelated to gear, pinion or mesh harmonics de-emphasized.
Figure 7:
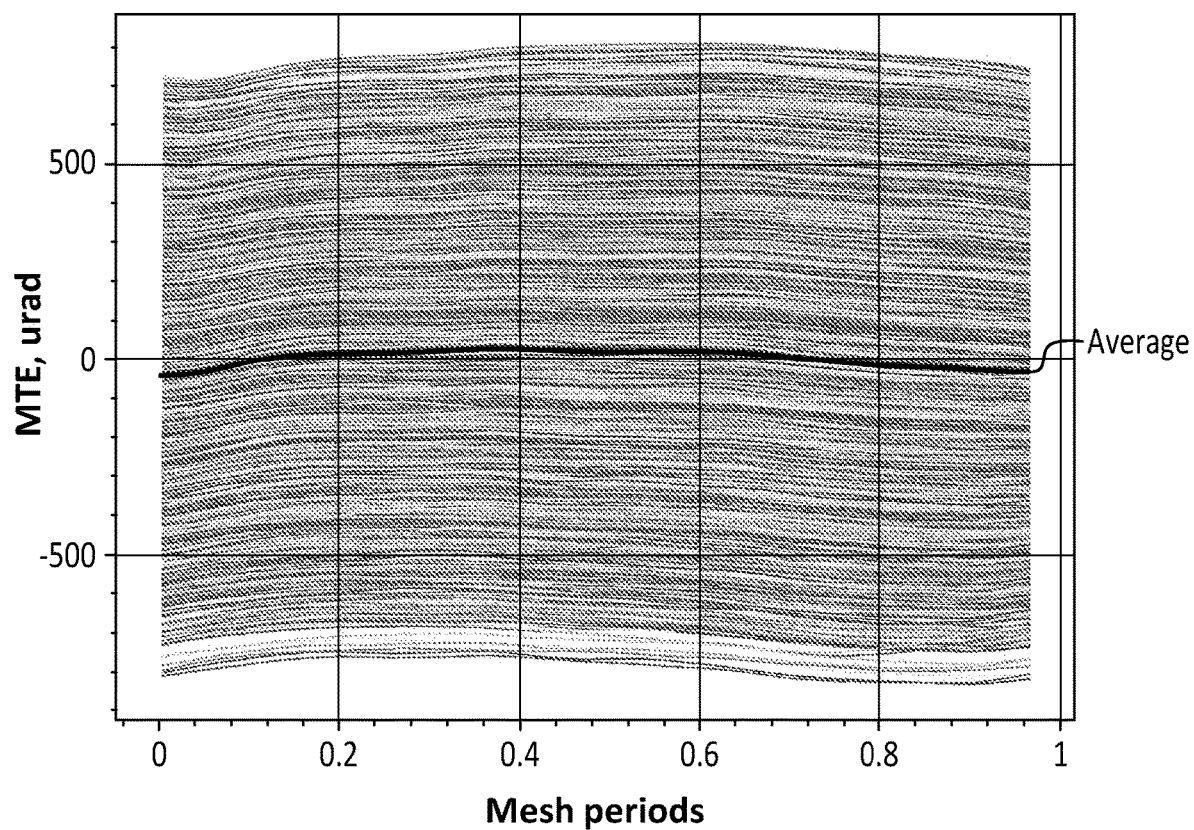
FIG. 7 shows a display of overlays of numerous MTE data frames of mesh-period scale, on a common axis with no model subtraction that would otherwise compensate for low-frequency variations between frames.

In DFT Magnitude visualization as shown in FIG. 6, a bar chart or line plot shows the magnitudes of a discrete Fourier transform (DFT) of the residuals for the current model or models, as a function of rotational frequencies of the input gear.

A control allows the operator to select a preferred display scale, as the fundamental frequency of any component or external basis represented in the model or models, which causes the rotational frequencies of the input gear to be expressed in units of the selected frequency.

A control allows the operator to enable a "virtual orbit", which causes the current data record to be zero-padded to a duration equal to the next-larger integer number of orbits of any two interconnected gears in the set so that rotational frequencies computed in the DFT coincide with the fundamental rotational frequencies of both members as well as the mesh frequency.

When magnitudes are displayed as a bar chart, bars for each DFT frequency bin are preferably individually colored, shaded, labeled or otherwise distinguished according to their correspondence to multiples of fundamental frequencies for each component or external basis (or the lack of correspondence to any such basis) to allow easy visual identification of correlations between periodic phenomena and frequencies attributable to individual members of the gear-set.

A tooltip allows the operator to position a cursor on the DFT plot to discover the magnitude and central rotational frequency in a specific DFT frequency bin.

In positional overlay visualizations as shown in FIGS. 7, 8, 9, and 10, a control allows the operator to select a preferred display scale, as the fundamental period of any component or external basis represented in the model or models, which causes the residuals for the current model or models to be subdivided as "segments" consisting of either:
- disjoint, contiguous intervals of durations equal to the selected fundamental period, or
- overlapping intervals of durations equal to the selected fundamental period plus an additional overlap interval, with consecutive segments overlapping by the overlap interval as selected automatically by software or manually by the operator.

A line plot for each selected measurement shows all subdivided residual segments for that measurement on common axes, with each segment preferably differentiated by color or style, as a function of the rotational position of the input gear relative to its position at the start of that segment, to permit review of the variability between segments of data not attributable to the determined model.

A tooltip allows the operator to position a cursor over one or more lines to identify the specific interval, as a function of rotational position of the input gear, over which the segment was defined.

A control allows the operator to toggle visibility, for each selected measurement, of the average residual over all displayed segments. The average is residual is depicted superimposed in black over individual segments in FIGS. 7, 8, 9 and 10.

A control allows the operator to toggle visibility, for each selected measurement, of a line or band as depicted in FIG. 8 that indicates the pointwise standard deviation, or a multiple therefore, of selected by user control, over all displayed segments.

Figure 11:
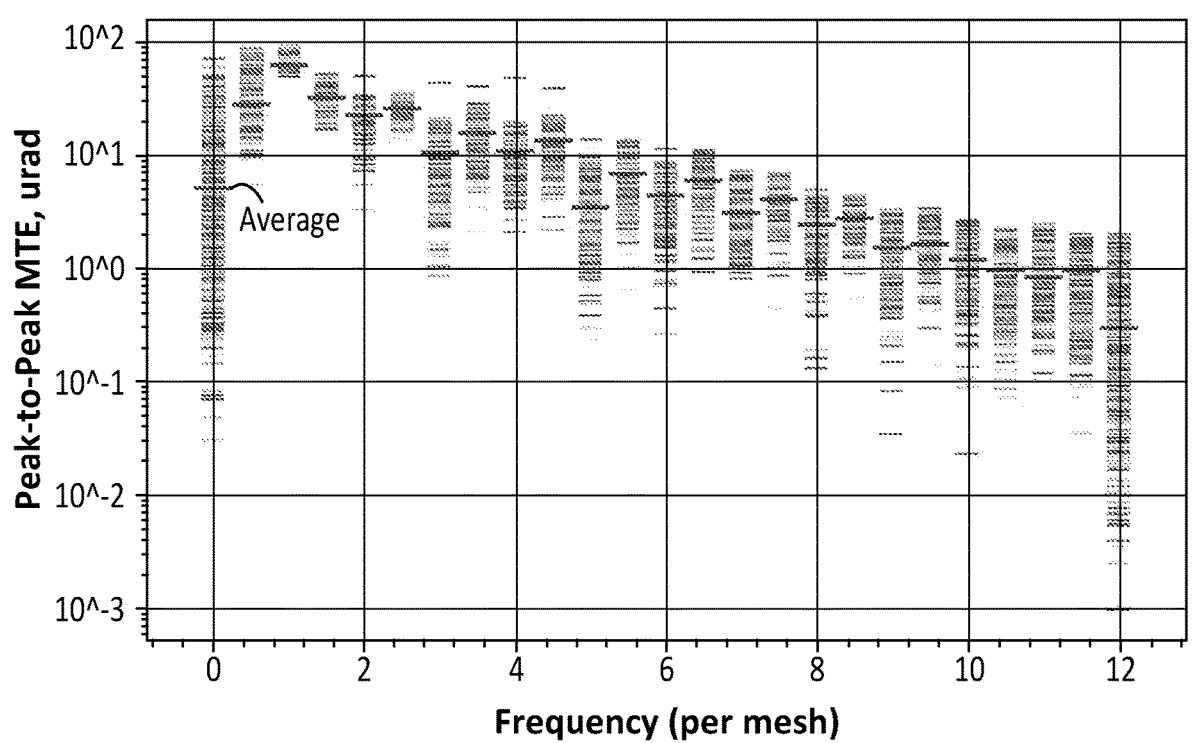
FIG. 11 shows the display of a plurality of spectral magnitudes obtained by computing the discrete Fourier transform for each frame in a positional overlay on a mesh-period scale, like that of FIG. 8. The mean magnitude as a function of frequency, computed in a magnitude-only sense, over all MTE frames is depicted by black bars superimposed over the grayscale distribution of individual spectral magnitudes.
Figure 12:
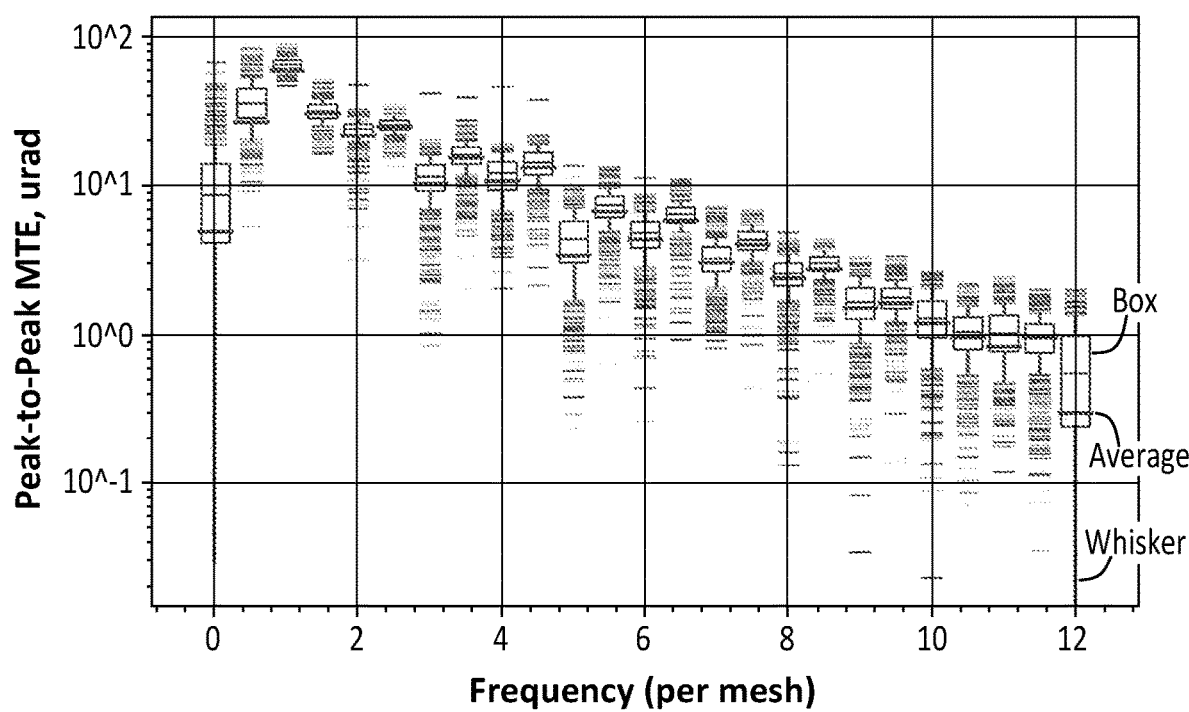
FIG. 12 shows the same overlay of spectral magnitudes depicted in FIG. 12, but with the horizontal axis shifted to display a different frequency range and the mean magnitude evaluated in a complex phased sense.

In spectral overlay visualizations of FIGS. 11 and 12, individual segments subdivided as described above for positional overlay views are converted to spectral magnitudes by computing a discrete Fourier transform of each segment. The magnitudes of the DFTs of each segment are collocated on a single set of axes that relates, by means of a bar chart or line plot, specific DFT frequency bins to the corresponding magnitudes of individual data segments.

Selection of the duration of each spectral overlay segment may be made automatically, for example by affixing the duration to that chosen for positional overlay display, or by specific user selection.

A tooltip allows the operator to position a cursor over one or more lines to identify the specific interval over which the segment was defined, along with detailed information about the frequency and magnitude corresponding to the cursor position.

Controls allow the operator to toggle visibility, for each selected measurement, of the average magnitude, computed as a mean of the spectral magnitudes, or the magnitude of the complex (phased) mean of the DFT coefficients, along with other statistical measures (for example, the first, second and third quartile points of the spectral magnitudes) in each DFT bin.

Controls allow the operator to toggle, for each selected measurement, the visibility of box-and-whisker plots that present visual information about statistical variations among DFT magnitudes throughout the segments. The lower and upper bounds of the box depict, respectively, the first and third quartiles of the magnitude distributions in each DFT frequency bin; a central line depicts the median. Whiskers extend above and below the box by a multiple of the interquartile range (the difference between the third and first quartiles) configurable by user control to depict a range of "typical" magnitudes. As depicted in FIG. 12, individual magnitude indicators may be hidden for those values within the range of the box-and-whisker plots to provide clarity.

In "Overlay" analysis, the residual error is divided into segments of a duration equal to a single revolution of one of the members or the period of contact between any two teeth. The resulting segments are overlaid on the same axes to allow comparison of relative features between multiple correlated intervals throughout the overall test. Summary statistics on the overlapping windows, including average response, per-sample standard deviation, ranges of values and RMS levels provide characterizations of results useful for comparing multiple gear sets and for identifying aberrant behavior in specific regions of individual gear sets. Visualization of the overlay analysis provides methods to identify individual segments and the summary statistics.

Figure 13:
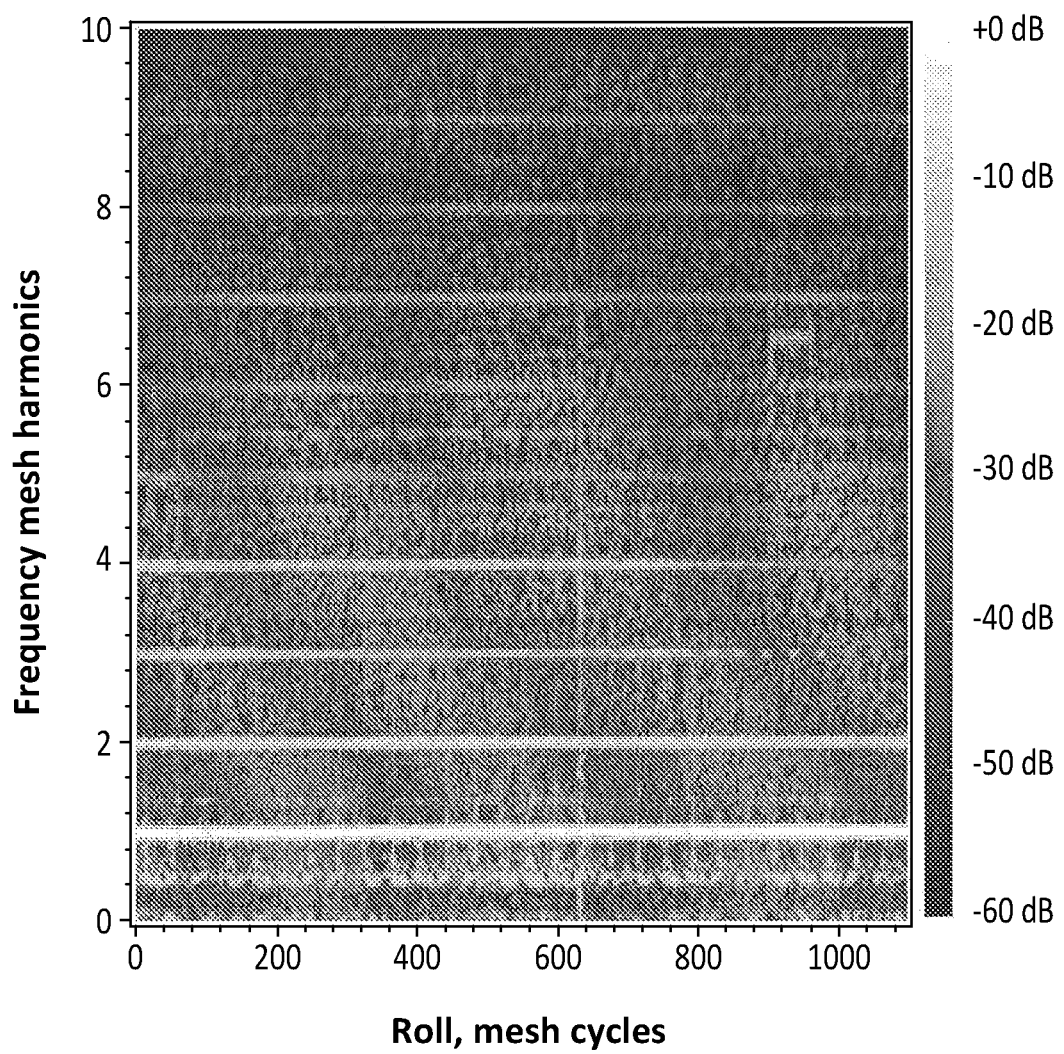
FIG. 13 illustrates a display of a spectrogram of MTE data with gear-scale and pinion-scale components subtracted. The positional and frequency content are displayed in units of mesh periods and fundamental mesh harmonics, respectively, with a grayscale value indicating the spectral magnitude at the given position and frequency bin.

In Spectrogram visualization of FIG. 13, an image for each selected measurement, as a two-dimensional color or grayscale map or two- or three-dimensional waterfall plot, shows the magnitude of the short-time Fourier transform (STFT) of the currently determined residual for that measurement.

A control allows the operator to select a display scale, as the fundamental frequency of any component or external basis represented in the model, which causes the rotational frequencies and positions of the input gear to be scaled in units of the selected frequency and period, respectively.

A control allows the operator to select a duration for the sliding positional window of the STFT, either as the absolute width or as the full-width half-maximum measure of the window function.

Offset between successive STFT positional windows may be determined by either manual selection, or by automatic determination such that the window duration, overlap and function satisfy, to within a predetermined tolerance, the constant overlap-add condition necessary to ensure that the STFT is invertible.

As an alternative to manual selection of the duration of the STFT positional window, the duration may be automatically selected together with the offset to provide positional and spectral resolution in a predetermined aspect ratio.

A control allows the operator to enable frequency and positional reassignment, which transforms the STFT image into a two-dimensional or three-dimensional scatter plot in which individual magnitudes of the STFT are shifted to irregular positions derived from phase information in the STFT.

Figure 14:
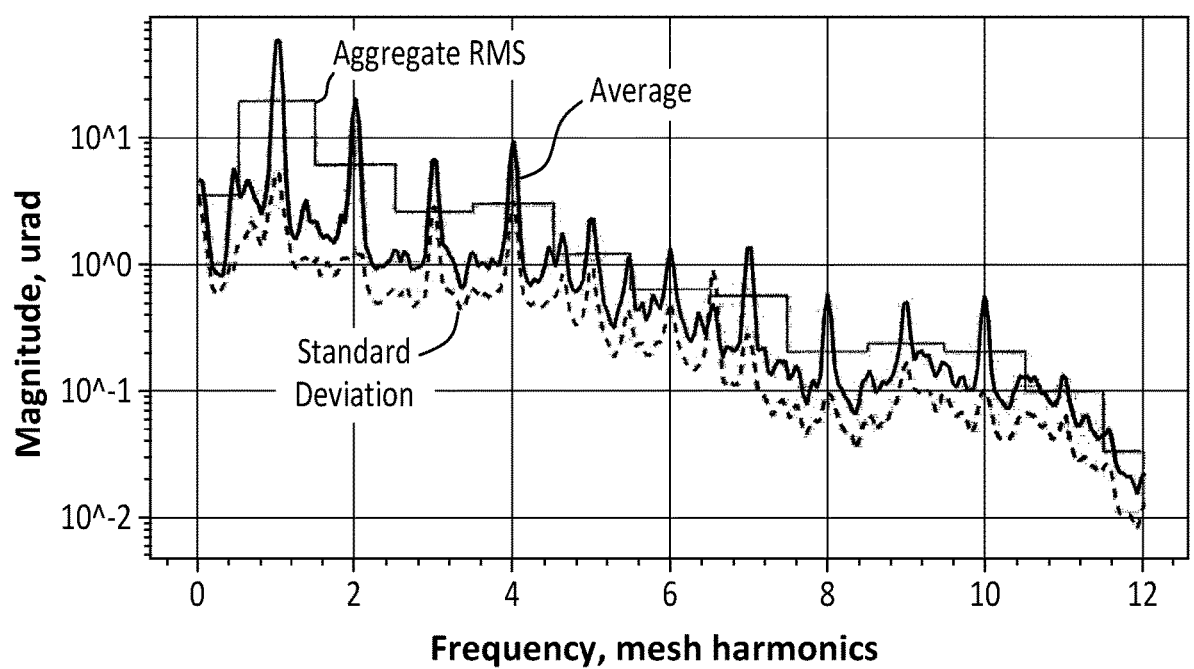
FIG. 14 illustrates the display of a periodogram calculated from the spectrogram shown in FIG. 13, along with the standard deviation of the spectral magnitudes for each frequency and an aggregate RMS magnitude computed over bandwidths of a single mesh harmonic.

A bar chart or line plot shows a periodogram (FIG. 14) calculated from the currently displayed STFT, as the average and standard deviation of the frequency response over all positional segments in the STFT.

A control allows the user to select a spectral scale, as the fundamental frequency of any component or external basis represented in the model such that the frequency is larger than the spectral resolution of the periodogram, which will be used to define contiguous but disjoint frequency bands of width equal to the selected frequency scale, centered on integer multiples of frequencies of the selected scale; over each band, a root-mean-square amplitude of the periodogram is computed and displayed as a bar chart or stepped line on the same axes as the periodogram.

Short-time spectral analysis is performed on the residual error to highlight long-term variations of mesh harmonics. Based on a selected temporal scale, which may be selected by the user or by software based on the duration of the test and the user's desired spectral bandwidth, a Gabor transform (a short-time Fourier transform with a Gaussian temporal window) is applied to the residual error and displayed as a two-dimensional spectrogram image with spectral magnitude varying along columns and temporal slices varying along rows. The temporal spacing between successive columns in the short-time Fourier transform is chosen based on the selected Gaussian window to avoid both a loss of temporal information and redundancy.

A periodogram (the average spectral magnitude computed over all columns in the spectrogram) shows the typical spectral response for an entire test, along with RMS magnitudes computed over bands equal to a single gear or pinion revolution, or a single period of mesh contact. Comparisons of individual spectral magnitudes to RMS levels in broader neighborhoods provides a measure of the concentration of power in the vicinity of harmonics of interest. Short-time spectral analysis also provides a basis for more detailed investigations. As an example, a time-varying average frequency in the vicinity of each mesh harmonic may be computed from the spectrogram to quantify phase drifts that would artificially diminish the spectral amplitudes reported by classical testing.

Figure 15:
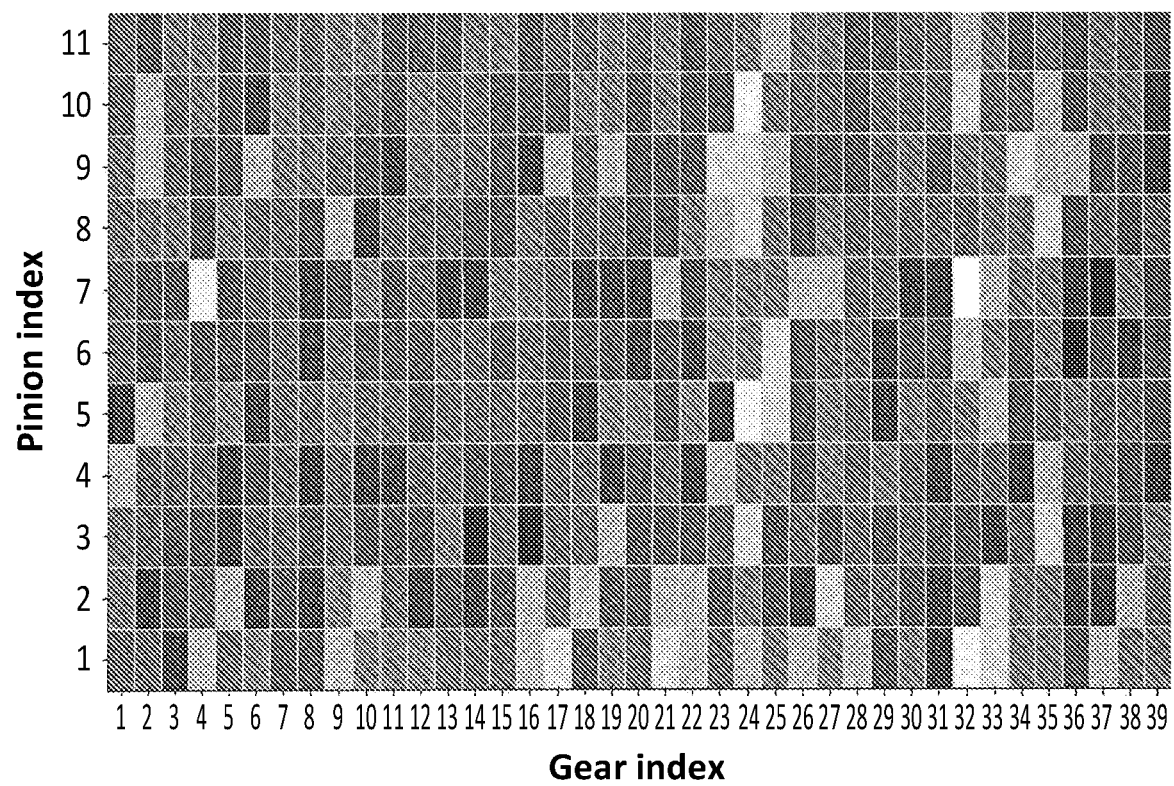
FIG. 15 shows a display of statistical measure computed on successive mesh-period frames of MTE data, mapped to individual periods of contact between specific gear and pinion teeth and represented by grayscale or color values.

In Mesh Grid visualization as shown in FIG. 15, an image for each selected measurement, as a two-dimensional color or grayscale map, shows statistical variations, where the statistic of interest is selected by user interaction, across mesh durations by mapping the statistic for each mesh period to the interaction of one specific tooth index on each of two interconnected gears in a set.

The residuals of the current models of one or more measurements are subdivided into disjoint, contiguous segments of duration equal to a single mesh period.

A reference signal is defined for each residual, either as the pointwise average of all segments, or as the expansion of only the mesh-period component basis of the model.

A tooltip allows the operator to position a cursor over an individual mesh period on the grid to discover the associated segment index, the tooth indices of the two interconnected members to which the segment period is mapped, and the numerical value of the selected statistic.

Separate images, each as a two-dimensional image consisting of a single row or column, or as a bar chart or line plot, show the value of the selected statistic as a function of tooth index for each interconnected member in the gear-set, respectively, where the statistic is averaged over all teeth of the conjugate member as contacted by the tooth of the member associated with the average display.

A control allows the operator to select an arbitrary set of mesh periods from the mesh-grid view for further examination.

Figure 16:
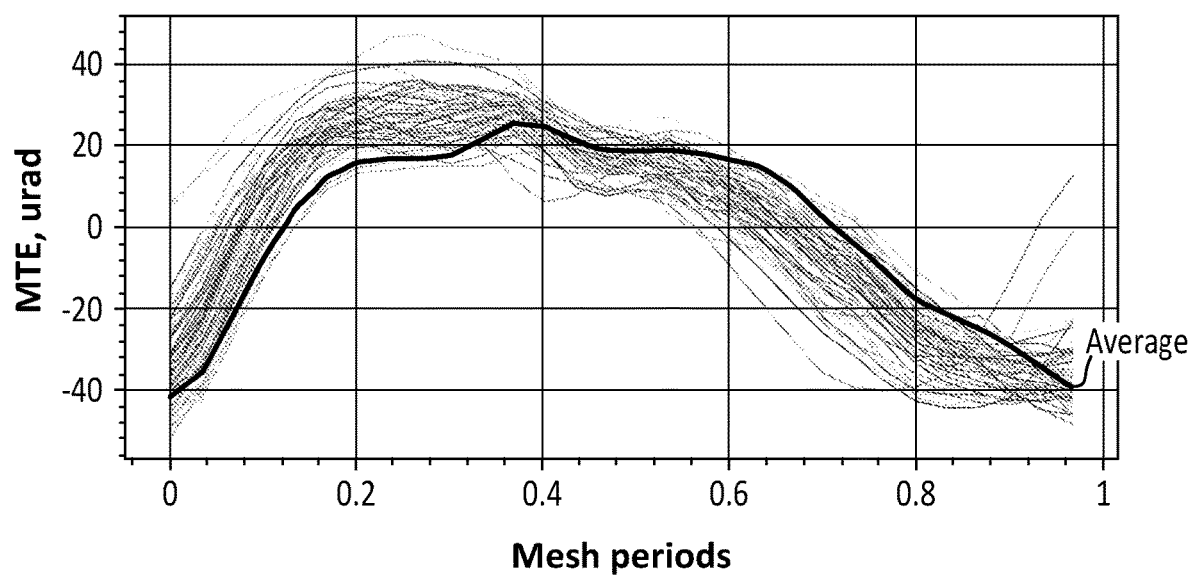
FIG. 16 depicts the presentation of specific mesh-period frames of MTE data to complement the mesh-grid view of FIG. 15, along with a reference curve, as the average per-mesh MTE, used in the evaluation of some per-mesh statistical measures.

A detail view (FIG. 16) may be presented alongside the mesh-grid view that allows one or more measurements from the selected mesh periods to be displayed as a function of input gear position relative to the start of each segment.

On the same axes as measurements for selected mesh periods, the detail view displays the reference signals derived for those measurements.

In "mesh-grid" analysis, residual error is divided into segments of a duration always equal to a single period of contact between two teeth. Each segment is mapped to the specific gear and pinion teeth in contact for its duration. A reference signal is computed as either the average of all per-tooth signals or an ideal reconstruction of a configurable number of mesh harmonics determined from the decomposition. Summary statistics are computed for each mesh interval:

Peak-to-peak amplitude;

Spacing error, as the signal delay that maximizes the cross-correlation between the selected reference signal and the error;

RMS (root-mean-square) error between the residual error and the selected reference;

The Pearson coefficient of correlation between the selected reference and the residual error; or One of multiple measures of waveform similarity between the reference and the error.

The mesh-grid visualization allows display of a selected summary statistic on a two-dimensional grid indexed in one dimension by gear tooth numbers and in the other dimension by pinion tooth numbers. An additional row and column provide, respectively, average values for the selected statistic when the gear or pinion tooth index is held constant. One or more intervals in the mesh grid may be selected to populate a detail view that shows the corresponding actual residual errors, overlaid on the same axes with the currently selected reference waveform.

Every visualization provides a mechanism to adjust the core model or models being displayed. The data may be provided by any previously determined analysis channel or by a "contract" channel composed of a record of measurements of predetermined length, collected previously or in real time.

User-interface controls allow the operator to select an arbitrary contiguous subset (a "range") of the full data record, over which the models is specifically computed.

A control allows the operator to down sample, by application of a low-pass filter and either decimation or local or global polynomial interpolation, the selected data record to accelerate processing.

Controls allow the operator to select independently the desired number of functions in each component, external or aperiodic basis used in the model.

If measurements other than motion transmission error are available in the data record, a control allows the operator to select the preferred measurement (or multiple measurements) for visualization.

From the selected range and down sampling rate, a core model and residual signal are derived for each selected measurement using the indicated number of basis functions within each series.

Multiple visualizations may be grouped by the operator into linked "sessions", or each visualization may be treated as its own independent session.

A network communication channel enables coordination among multiple views of a single session, whereby operator settings and portions of signals identified by the operator for closer inspection. As the operator adjusts settings or highlights portions of the displayed signals in one visualization, the corresponding settings are applied and selections highlighted in all other visualizations within the same session.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of testing gears, said method comprising:
   providing a pair of gears comprising a first gear and a second gear, said first gear and said second gear being operable to roll in mesh with one another,
   rolling said first gear with said second gear on a gear testing machine, said gear testing machine being configured with one or more sensors operable to provide an output signal indicative of a rolling characteristic of one or more gears,
   producing at least one independent signal, said independent signal being at least one of a signal based on output from said one or more sensors or an analytically derived signal,
   selecting at least one frame portion having a non-zero duration from said at least one independent signal, wherein each of said selected at least one frame portion is processed according to the following steps:
   determining a set of model basis functions based on the selected frame portion,
   projecting the selected frame portion onto said model basis functions to produce model coefficients,
   determining a reconstructed model from said model coefficients and said model basis functions,
   subtracting said reconstructed model from the selected frame portion to yield a residual,
   wherein said method further comprises at least one of:
   (a) displaying and analyzing said residual to identify quality characteristics of at least one of said first gear and said second gear,
   accepting or rejecting said at least one of said first gear and said second gear based on said quality characteristics,
   and
   (b) displaying and analyzing said model coefficients or reconstructed model to identify quality characteristics of at least one of said first gear and said second gear,
   accepting or rejecting said at least one of said first gear and said second gear based on said quality characteristics.

2. The method of claim 1 wherein said model basis functions are determined from at least one of:
   (a) duration of the selected frame portion,
   (b) gear ratio of said first gear and said second gear,
   (c) fundamental harmonic frequencies produced by rotation of said first gear with said second gear or duration of a mesh period of said first gear in mesh with said second gear,
   (d) a predetermined set of harmonics for each fundamental frequency, said set including zero, and
   (e) a set of aperiodic basis functions defined over the duration of said selected frame portion, said set including zero.

3. The method of claim 1 where said reconstructed model and said residual are continually reevaluated as additional information is obtained from the sensors during machine operation.

4. The method of claim 1 where a plurality of said independent signals are sampled simultaneously at coincident intervals to facilitate direct correlation and comparison.

5. The method of claim 1 where said at least one independent signal is collected at uniform temporal samples and are subsequently interpolated to produce a sequence of samples regularly spaced in the position of one of said first gear and said second gear.

6. The method of claim 1 wherein displaying of a residual, reconstructed model, or a combination thereof comprises:
   (a) subdividing the selected frame portion into a plurality of contiguous signal segments of equal duration, with the duration equal to one or more of the following:
   1. one or more entire mesh periods,
   2. one or more entire revolutions of any gear in the set,
   (b) representing the signal segments as functions of one or more of the following:
   1. time,
   2. position of one of the gears in the set,
   3. frequency, by means of a Fourier transform,
   (c) presenting the signal segment functions, aligned and overlaid on the same independent axis, as one or more of the following:
   1. traces of the signal segment functions,
   2. traces of statistical variations of the signal segment functions, consisting of the arithmetic mean and/or variance, determined pointwise.

7. The method of claim 1 wherein displaying of a residual, reconstructed model, or combination thereof of the two comprises:
   (a) subdividing the selected frame portion into a plurality of contiguous signal segments of equal duration, with the duration equal to one or more entire mesh periods,
   (b) determining, for each signal segment, a scalar metric for each signal segment, consisting of one or more of:
   1. peak-to-peak variation,
   2. root-mean-squared amplitude,
   3. a temporal or rotational shift of the signal segment necessary to best align the signal segment with a reference, determined as either: the average of at least two segments or a subset of the reconstructed model with the same duration as the signal segments,
   4. measures of similarity to a reference determined as either: the average of at least two segments or a subset of the reconstructed model with the same duration as the signal segments, consisting of one or more of the following: Pearson correlation coefficient and/or root mean squared error,
   (c) assigning to each segment two indices, the first index corresponding to either:
   1. the number of entire revolutions of one of the first gear or the second gear observed in the segment signal prior to the start of the segment duration, or 2. the number of mesh periods observed prior to the start of the segment duration, modulo the number of teeth on said one of the first gear or the second gear, the second index corresponding to either:

3. the number of entire revolutions of the other of the first gear or the second gear observed in the segment signal prior to the start of the segment duration, or 4. the number of mesh periods observed prior to the start of the segment duration, modulo the number of teeth on the other of the first gear or the second gear, (d) presenting the scalar metrics, mapped to a range of grayscale or color values, onto a two-dimensional image where one coordinate of the image corresponds to the first index and the other coordinate of the image corresponds to the second index.

8. The method of claim 1 wherein displaying of a residual, reconstructed model, or combination thereof comprises:

(a) subdividing the selected frame portion into a plurality of contiguous or overlapping signal segments of predetermined, equal duration, each indexed sequentially, (b) representing, by means of a Fourier transform, the signal segments as spectral functions, (c) determining, from the spectral functions, one or more of the following measures:

1. magnitude,
2. log-magnitude,
3. phase,
4. phase drift, as the difference between actual phase and that predicted by advancing the phase of a preceding spectral function by the temporal or rotational separation between the two segments, (d) presenting the spectral measures, with values mapped to a range of grayscale or color values, as a two-dimensional image where one coordinate of the image corresponds to the index of the segment and the other coordinate of the image corresponds to the frequency variable of the spectral function.

9. The method of claim 1 wherein displaying comprises: traces of one or more of the residual, reconstructed model, or a combination thereof on a plot where the independent axis represents time or position of one of the first gear or the second gear in the gear set and the dependent axis represents amplitude of the displayed quantity.

10. The method of claim 1 wherein displaying of model coefficients comprises:

plotting one or more of:

(a) a bar chart with one bar per coefficient, with a height proportional to the magnitude of the coefficient;

(b) one or more radial plots on which line segments are drawn, one per coefficient, emanating from the coordinate origin and having a length proportional to the complex magnitude of corresponding coefficients and an angle with the horizontal axis proportional to the complex phase of the corresponding coefficients.

11. The method of claim 1 where displays and analytical results are retained on an electronic storage medium for recall, with display and comparison of more than one prior record accomplished by one or more of the following:

(a) simultaneous adjacent presentation, (b) sequential presentation with progression directed by user interaction, (c) sequential presentation with automatic, animated progression.

12. A method of testing gears, said method comprising:

providing a pair of gears comprising a first gear and a second gear, said first gear and said second gear being operable to roll in mesh with one another, rolling said first gear with said second gear on a gear testing machine, said gear testing machine being configured with one or more sensors operable to provide an output signal indicative of a rolling characteristic of one or more gears, producing at least one independent signal, said independent signal being at least one of a signal based on output from said one or more sensors or an analytically derived signal, selecting at least one frame portion having a non-zero duration from said at least one independent signal, wherein each of said selected at least one frame portion is processed according to the following steps:

determining a set of model basis functions based on the selected frame portion, projecting the selected frame portion onto said model basis functions to produce model coefficients, determining a reconstructed model from said model coefficients and said model basis functions, subtracting said reconstructed model from the selected frame portion to yield a residual, wherein said method further comprises at least one of:

displaying and analyzing said residual to identify quality characteristics of at least one of said first gear and said second gear, accepting or rejecting said at least one of said first gear and said second gear based on said quality characteristics, and displaying and analyzing said model coefficients or reconstructed model to identify quality characteristics of at least one of said first gear and said second gear, accepting or rejecting said at least one of said first gear and said second gear based on said quality characteristics, said method being conducted in an always-on mode wherein the preceding steps are repeated and performed continuously as long as a coordinated motion between said pair of gears is detected by said one or more sensors and new frames of data can be filled.

13. The method of claim 12 wherein the tooth ratio of said first and second gears being rolled is not known in advance in the always-on mode but the always-on mode determines the tooth ratio based on the real-time data it receives.

14. The method of claim 12 wherein a user can observe information comprising at least one of measurements, displays, visualizations and results at any time when the always-on mode is operating, said information being available independent of whether any other testing mode is concurrently active.

15. The method of claim 14 wherein said information comprising at least one of measurements, displays, visualizations and results includes at least one of:

(a) amplitude and phasing of one or more harmonics of the frequency associated with a mesh period;

(b) average signal shape over the duration of one mesh period;

(c) gear runout harmonic amplitudes;

(d) average signal shape of gear runout;

(e) presence and location of tooth damage;

(f) average signal shape with pinion bases removed; and (g) average signal shape with gear bases removed.

16. The method of claim 12 further comprising interactively manipulating the displays to better examine aspects of the displayed data.

17. The method of claim 12 wherein displays can be put on hold so that a current set of displayed data can be examined without being replaced by subsequent frames.

18. The method of claim 12 wherein a current set of data can be captured and stored for retrieval or examination later and/or for comparison with current data.

19. The method of claim 12 wherein differences between current data and stored reference or master data can be examined and visualized.

20. The method of claim 12 wherein the always-on mode further comprises recognizing and localizing tooth damage on at least one of said first gear and said second gear without a requirement for separate set up of any testing parameters or settings, said always-on mode identifying part rotation or tooth indices that best represent the location of the recognized damage, said always-on mode automatically informing the user of such damage through textual messaging and/or graphical displays.

* * * * *